United States Patent
Sakamoto et al.

(10) Patent No.: US 10,303,346 B2
(45) Date of Patent: May 28, 2019

(54) INFORMATION PROCESSING APPARATUS, NON-TRANSITORY COMPUTER READABLE STORAGE MEDIUM, AND INFORMATION DISPLAY METHOD

(71) Applicant: YAHOO JAPAN CORPORATION, Tokyo (JP)

(72) Inventors: Ryuki Sakamoto, Tokyo (JP); Kenji Suzuki, Tokyo (JP); Kazumasa Okabe, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 332 days.

(21) Appl. No.: 15/198,693

(22) Filed: Jun. 30, 2016

(65) Prior Publication Data

US 2017/0010791 A1    Jan. 12, 2017

(30) Foreign Application Priority Data

Jul. 6, 2015    (JP) .................................. 2015-135682

(51) Int. Cl.
*G06F 3/0482* (2013.01)
*G06F 3/0484* (2013.01)
(Continued)

(52) U.S. Cl.
CPC ........ *G06F 3/04842* (2013.01); *G06F 3/0486* (2013.01); *G06F 3/04812* (2013.01); *G06F 3/04883* (2013.01)

(58) Field of Classification Search
CPC .................................................. G06F 3/04812
See application file for complete search history.

(56) References Cited

U.S. PATENT DOCUMENTS 9,146,672 B2 * 9/2015 Hicks ................... G06F 3/04883
9,785,240 B2 * 10/2017 Denoue ................. G06F 17/277
(Continued)

FOREIGN PATENT DOCUMENTS

JP    2013-218669 A    10/2013
JP    2014-035611 A    2/2014

OTHER PUBLICATIONS

Nov. 24, 2015 Office Action issued in Japanese Patent Application No. 2015-135682.

*Primary Examiner* — Justin S Lee
(74) *Attorney, Agent, or Firm* — Oliff PLC

(57) ABSTRACT

An information processing apparatus includes cursor control, display position change, and range selection units. When switching operation for switching to a selection mode for selecting characters included in a display region displayed in a display unit is detected, the cursor control unit displays another cursor different from a cursor displayed in the display region. When moving operation for moving the display region is detected in the selection mode, the display position change unit maintains one cursor at an original display position or a certain position near the original display position in the display unit, and moves a display position of the display region together with the other cursor in accordance with the moving operation. The range selection unit determines, to be a selection range, a region between the one cursor and the other after the movement of the display position of the display region by the display position change unit.

15 Claims, 12 Drawing Sheets

(51) Int. Cl.
*G06F 3/0481* (2013.01)
*G06F 3/0486* (2013.01)
*G06F 3/0488* (2013.01)

(56) References Cited

U.S. PATENT DOCUMENTS

| | | | |
|---|---|---|---|
| 2006/0005151 A1* | 1/2006 | Altman | G06F 3/0481 715/860 |
| 2007/0157085 A1* | 7/2007 | Peters | G06F 17/24 715/202 |
| 2007/0260981 A1* | 11/2007 | Kim | G06F 3/04812 715/256 |
| 2007/0294644 A1* | 12/2007 | Yost | G06F 3/04812 715/856 |
| 2008/0259040 A1* | 10/2008 | Ording | G06F 3/0488 345/173 |
| 2009/0109182 A1* | 4/2009 | Fyke | G06F 3/0488 345/173 |
| 2009/0128505 A1* | 5/2009 | Partridge | G06F 3/04883 345/173 |
| 2009/0228792 A1* | 9/2009 | van Os | G06F 3/0488 715/702 |
| 2009/0228842 A1* | 9/2009 | Westerman | G06F 3/04883 715/863 |
| 2010/0171713 A1* | 7/2010 | Kwok | G06F 3/0488 345/173 |
| 2010/0235793 A1* | 9/2010 | Ording | G06F 1/1626 715/863 |
| 2010/0289757 A1* | 11/2010 | Budelli | G06F 3/04842 345/173 |
| 2010/0293460 A1* | 11/2010 | Budelli | G06F 3/04842 715/702 |
| 2011/0018812 A1* | 1/2011 | Baird | G06F 3/04886 345/173 |
| 2011/0107211 A1* | 5/2011 | Chu | G06F 3/04812 715/702 |
| 2011/0202835 A1* | 8/2011 | Jakobsson | G06F 3/0481 715/702 |
| 2012/0044173 A1* | 2/2012 | Homma | G06F 3/04812 345/173 |
| 2012/0139844 A1* | 6/2012 | Ramstein | G06F 3/016 345/173 |
| 2012/0306772 A1* | 12/2012 | Tan | G06F 3/0488 345/173 |
| 2012/0311422 A1* | 12/2012 | Weeldreyer | G06F 3/0488 715/220 |
| 2012/0311507 A1* | 12/2012 | Murrett | G06F 3/041 715/863 |
| 2013/0002719 A1* | 1/2013 | Ide | G06F 3/0481 345/660 |
| 2013/0024820 A1* | 1/2013 | Kirkpatrick | G06F 3/04883 715/863 |
| 2013/0080979 A1* | 3/2013 | Weir | G06F 3/033 715/856 |
| 2014/0002377 A1* | 1/2014 | Brauninger | G06F 3/0482 345/173 |
| 2014/0109016 A1* | 4/2014 | Ouyang | G06F 17/24 715/856 |
| 2014/0306899 A1* | 10/2014 | Hicks | G06F 3/04883 345/173 |
| 2014/0327615 A1* | 11/2014 | Watari | G06F 3/04812 345/157 |
| 2015/0046856 A1* | 2/2015 | Rucker | G06F 3/04883 715/765 |
| 2015/0116218 A1* | 4/2015 | Yang | G06F 21/31 345/158 |
| 2015/0143273 A1* | 5/2015 | Bernstein | G06F 3/0488 715/767 |
| 2015/0253870 A1* | 9/2015 | Ikeda | G06F 3/0233 345/158 |

* cited by examiner

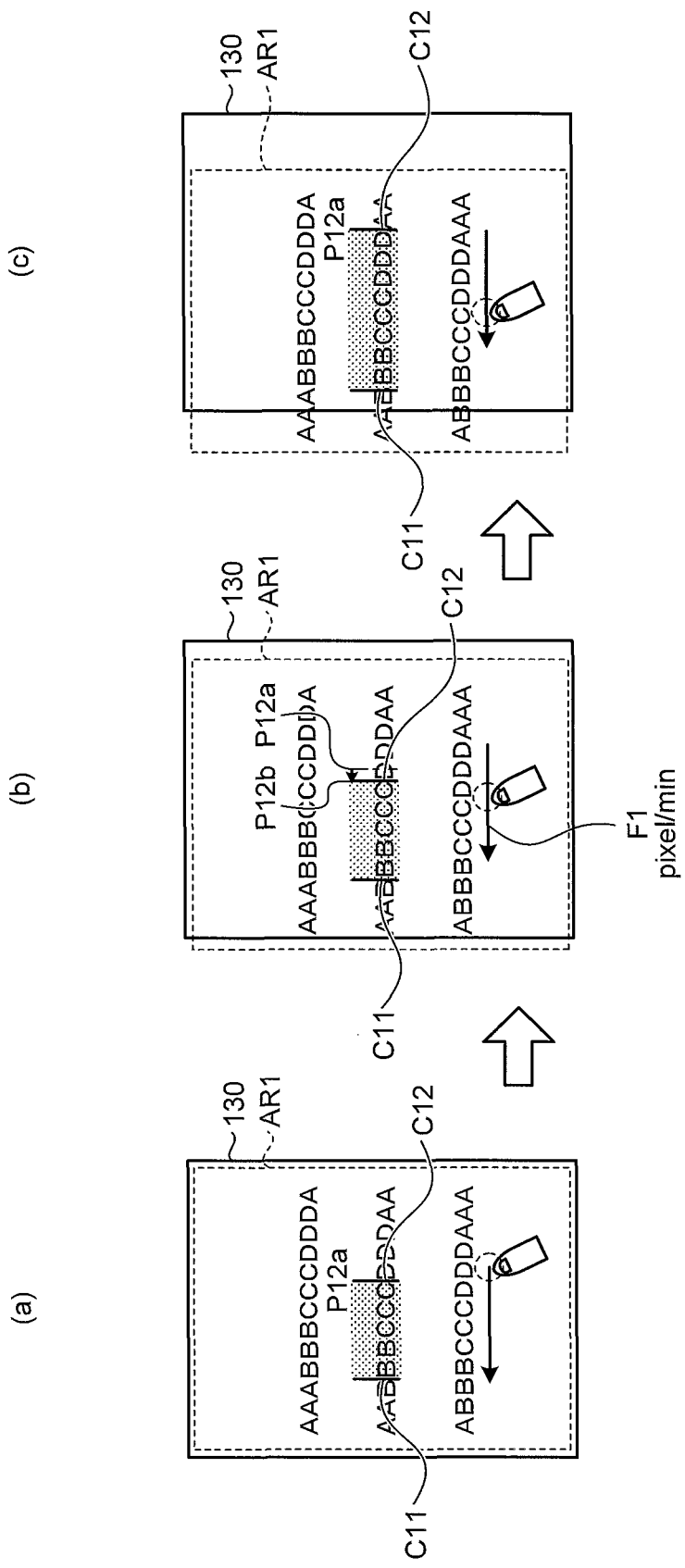

INFORMATION PROCESSING APPARATUS, NON-TRANSITORY COMPUTER READABLE STORAGE MEDIUM, AND INFORMATION DISPLAY METHOD

CROSS-REFERENCE TO RELATED APPLICATION(S)

The present application claims priority to and incorporates by reference the entire contents of Japanese Patent Application No. 2015-135682 filed in Japan on Jul. 6, 2015.

BACKGROUND OF THE INVENTION

1. Field of the Invention

The present invention relates to an information processing apparatus, a non-transitory computer readable storage medium having stored therein an information display program, and an information display method.

2. Description of the Related Art

Information processing apparatuses such as smartphones and tablet terminals are widespread. In an example of such information processing apparatus, a part of a text can be selected by the touching of the text on a touch panel displayed in a display unit with a finger to move a cursor to the touch position or tracing a display screen of the display unit with a finger via the touch panel, for example.

A technique that magnifies and displays a part of a text so as to allow a user to easily touch a desired position is known as a technique for text editing operation using such a touch panel. For example, a technique is known that displays text by increasing spacing between characters when tap operation is received during text editing (e.g., refer to Japanese Patent Application Laid-open No. 2014-35611).

The conventional technique only magnifies and displays a part of a text. It is difficult in the conventional technique to move well a cursor to a starting point or an ending point that designates a selection range in some cases such as a case where characters on a display screen are covered by a finger when a certain part of the text is selected. In this way, the usability of the conventional technique described above is not always high.

SUMMARY OF THE INVENTION

It is an object of the present invention to at least partially solve the problems in the conventional technology.

According to one aspect of an embodiment, an information processing apparatus includes a cursor control unit that displays, in a display region displayed in a display unit, another cursor different from a cursor displayed in the display region when switching operation for switching to a selection mode for selecting a display object included in the display region is detected. The information processing apparatus includes a display position change unit that maintains one cursor at an original display position or a certain position near the original display position in the display unit and moves a display position of the display region in accordance with moving operation for moving the display region together with the other cursor when the moving operation is detected in the selection mode. The information processing apparatus includes a range selection unit that determines, to be a selection range, a region between the one cursor and the other cursor after the movement of the display position of the display region by the display position change unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8A is a schematic diagram explaining a cursor position according to the movement of the display region;

DETAILED DESCRIPTION OF THE PREFERRED EMBODIMENTS

The following describes an embodiment of an information processing apparatus, a non-transitory computer readable storage medium having stored therein an information display program, and an information display method according to the invention in detail with reference to the accompanying drawings. The present embodiment does not limit the information processing apparatus, the information display program, and the information display method according to the invention.

1. Range Selection Processing

The following describes range selection processing according to the present embodiment with reference to FIGS. 1A to 1E. FIGS. 1A to 1E are schematic diagrams illustrating an example of the range selection processing according to the present embodiment. The range selection processing according to the present embodiment is performed by an information processing apparatus 100 illustrated in FIGS. 1A to 1E. The information processing apparatus 100, which is a tablet terminal, for example, includes a display unit 130 such as a liquid crystal display.

The information processing apparatus 100 employs a touch panel and receives various types of operation made by the touching of the touch panel of the display unit 130 with a finger, for example. The touching of the touch panel of the display unit 130 is also described as the touching of the display unit 130 in the following description. When receiving moving operation (called sliding operation or swiping operation, for example) that traces the display unit 130 with a finger, for example, the information processing apparatus 100 moves a display position of a display region AR1 where text is displayed in the display unit 130, for example, and makes it possible to perform selection on the text by controlling two cursors in accordance with the movement. The following describes the processing with reference to FIGS. 1A to 1E.

Figure 1A:
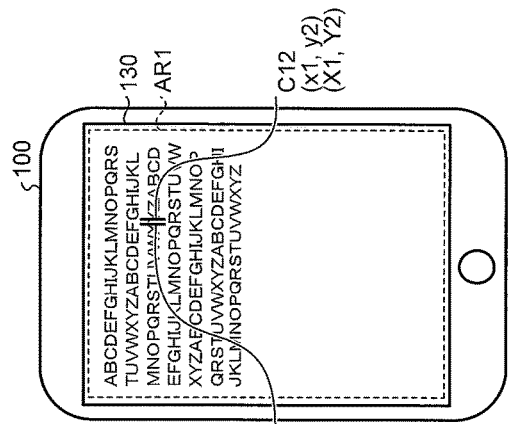
FIGS. 1A to 1E are schematic diagrams illustrating an example of range selection processing according to an embodiment.

As illustrated in FIG. 1A, the information processing apparatus 100 is assumed to be in a state where an application that can edit the text (in this case, the application is a memo pad application) is started therein. The information processing apparatus 100 displays the text in the display region AR1 in the display unit 130 and a cursor C11 that indicates the position to which a character is input. In the present embodiment, the text is displayed by the memo pad application. The manner to display the text is, however, not limited to this example. The text may be displayed by mail software, character input software, or a web page, for example. In the present embodiment, a display object displayed in the display region AR1 is characters (text). The display object may be other than characters. Examples of the display object may include pictographs and photographs.

In the present embodiment, a coordinate system with x axis and y axis is defined as the coordinate system in the display unit 130. A coordinate system with X axis and Y axis is defined as the coordinate system in the display region AR1. FIG. 1A illustrates an example in which the position of the cursor C11 in the display unit 130 is the position (x1,y2) while the position of the cursor C11 in the display region AR1 is the position (X1,Y2).

It is assumed that a user wants to select characters from "Y" in the third line to "P" in the fifth line in the text. The user applies a certain operation to the display unit 130 so as to cause the information processing apparatus 100 to switch to a selection mode in which characters included in the display region are selected. In the present embodiment, the switching operation to cause the information processing apparatus 100 to switch to the selection mode is a double tap at any position on the display unit 130.

As illustrated in FIG. 1A, the user is assumed to perform a double tap at a position P01, which is any position, while the cursor C11 is positioned between "X" and "Y" in the third line of the text, for example.

Figure 1C:
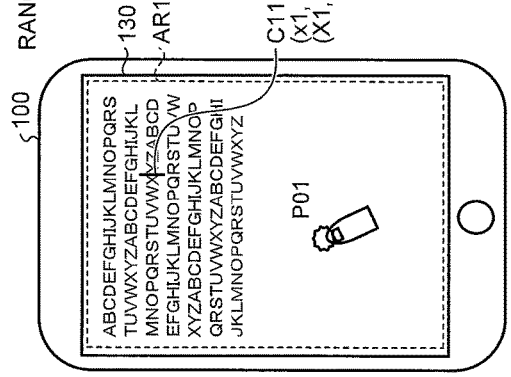
Figure 1B:
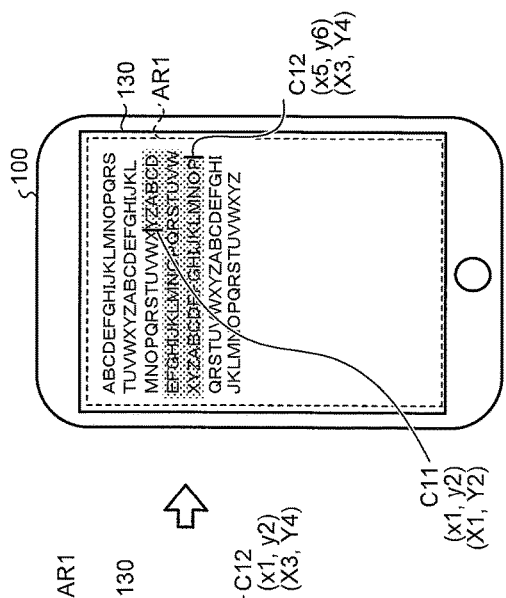

When detecting the double tap, which is the switching operation for switching to the selection mode, the information processing apparatus 100 displays a cursor C12, which differs from the cursor C11, at the same position as the cursor C11 as the selection mode, as illustrated in FIG. 1B. The same position as the cursor C11 means that the position of the cursor C12 is the same as both positions of the cursor C11 in the display unit 130, i.e., the position (x1,y2), and the position of the cursor C11 in the display region AR1, i.e., the position (X1,Y2). The user, thus, sees the two cursors as if they overlap with each other when switching to the selection mode by double tap.

At the state illustrated in FIG. 1C, the information processing apparatus 100 is assumed to detect moving operation that traces the display unit 130 from a position P02, which is any position, to a position P03 with a finger. In this case, as illustrated in FIG. 1D, the information processing apparatus 100 moves the display position of the display region AR1 in accordance with the moving operation while maintaining the cursor C12 at the position (x1,y2) in the display unit 130 and the cursor C11 at the position (X1,Y2) in the display region AR1.

Figure 1D:
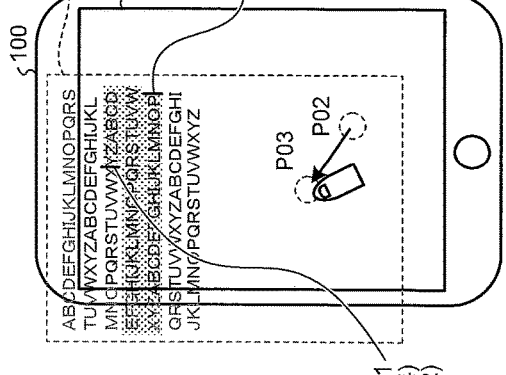

The position of the cursor C12 in the display unit 130, thus, remains at the position (x1,y2) without being changed in FIGS. 1C and 1D. In contrast, the position of the cursor C12 in the display region AR1 moves to the position at the coordinates (X3,Y4), which is the position of "P" in the fifth line in the text as illustrated in FIG. 1D whereas the cursor C12 is located at the position (X1,Y2), which is the position between "X" and "Y" in the third line in the text as illustrated in FIG. 1C.

The position of the cursor C11 in the display region AR1, thus, remains at the position (X1,Y2), which is the position between "X" and "Y" in the third line in the text, without being changed in FIGS. 1C and 1D. In contrast, the position of the cursor C11 in the display unit 130 moves to the position (x3,y4) as illustrated in FIG. 1D whereas the cursor C11 is positioned at the position (x1,y2) as illustrated in FIG. 1C.

The information processing apparatus 100 determines a region sandwiched between the cursors C11 and C12 to be a selection range by moving the display position of the display region AR1 in accordance with the moving operation while controlling the positions of the cursors C11 and C12 as described above. FIG. 1D illustrates an example of the information processing apparatus 100 in which the selection range is presented to the user by differentiating a background color of character strings displayed in the selection range from a background color of the other character strings.

The processing performed by the information processing apparatus 100 makes it possible for the user to adjust the position of the cursor C12 serving as the ending point of the selection range to any position (e.g., the position of "P" in the fifth line in the text) by moving the display region AR1 while the cursor C11 serving as the starting point of the selection range is fixed at any position in the text (e.g., the position between "X" and "Y" in the third line in the text).

It is assumed that the user releases the finger from the display unit 130 when the moving operation reaches the position P03. The information processing apparatus 100, thus, does not detect the moving operation, and then returns the display region AR1 to the original position of the display region AR1 before the movement while maintaining the cursor C12 at the position (X3,Y4) in the display region AR1 and the cursor C11 at the position (X1,Y2) in the display region AR1.

Figure 1E:
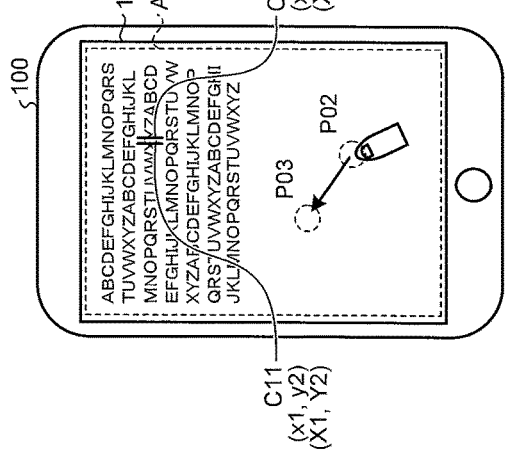

As a result, the position of the cursor C12 in the display unit 130 moves to the position (x5,y6) as illustrated in FIG. 1E in accordance with the moving operation whereas the cursor C12 is positioned at the position (x1,y2) as illustrated in FIG. 1D. In contrast, the position of the cursor C12 in the display region AR1 remains at the position (X3,Y4), which is the position of "P" in the fifth line in the text, without being changed in FIGS. 1D and 1E.

The position of the cursor C11 in the display region AR1 remains at the position (X1,Y2), which is the position between "X" and "Y" in the third line in the text, without being changed in FIGS. 1D and 1E. In contrast, the position of the cursor C11 in the display unit 130 moves to the position (x1,y2) in accordance with the moving operation as illustrated in FIG. 1E whereas the position of the cursor C11 in the display unit 130 is the position (x3,y4) as illustrated in FIG. 1D. The cursor C11 returns to the position before the movement in the display unit 130.

In this way, the information processing apparatus 100 moves the display position of the display region AR1 in accordance with the moving operation while maintaining the cursor C12 at the position in the display unit 130 and the cursor C11 at the position in the display region AR1. The information processing apparatus 100, thus, determines the region sandwiched between the cursors C11 and C12 to be the selection range in accordance with the movement of the display position of the display region AR1.

It is difficult for the user to move well the cursor to a desired position serving as the ending point of the selection range in some cases such as a case where characters are covered by a finger when selecting certain part of the text, for example. As described with reference to FIG. 1D, the information processing apparatus 100 according to the present embodiment allows the user to adjust the position of the cursor C12 to the ending point by moving the display region AR1, thereby making it possible for the user to easily and accurately select the range. The information processing apparatus 100, thus, can enhance the usability in the text selection operation.

2. Structure of Information Processing Apparatus

Figure 2:
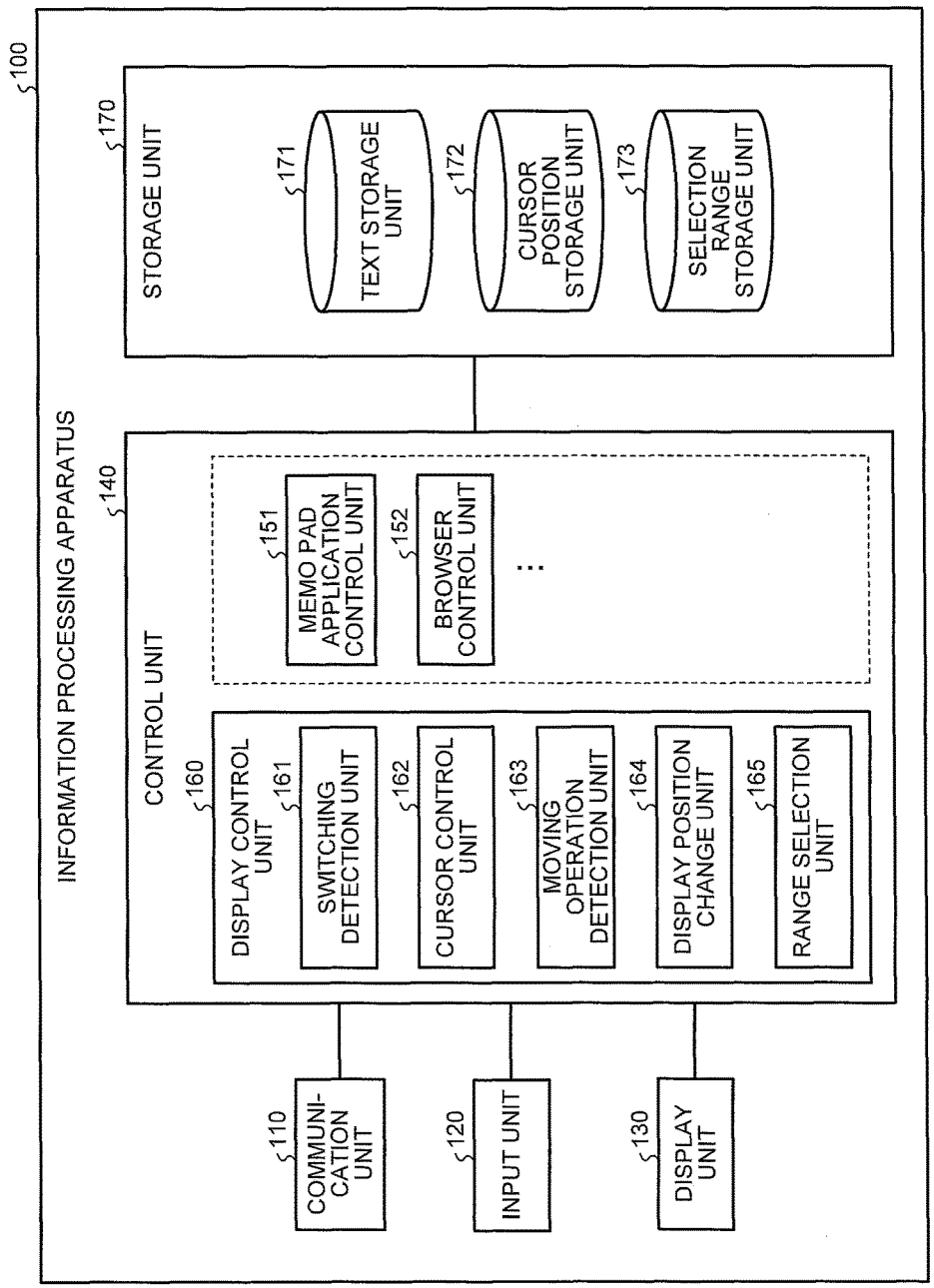
FIG. 2 is a schematic diagram illustrating an exemplary structure of an information processing apparatus according to the embodiment.

The following describes the information processing apparatus 100 with reference to FIG. 2. FIG. 2 is a schematic diagram illustrating an exemplary structure of the information processing apparatus 100 according to the present embodiment. The information processing apparatus 100 illustrated in FIG. 2 is provided with a touch panel. The information processing apparatus 100 is a tablet terminal, a personal computer (PC), a mobile phone, or a personal digital assistant (PDA), for example. As illustrated in FIG. 2, the information processing apparatus 100 includes a communication unit 110, an input unit 120, the display unit 130, a control unit 140, and a storage unit 170.

The communication unit 110 is achieved by a network interface card (NIC), for example. The communication unit 110 is connected to a network in a wired or wireless manner, and exchanges information between itself and other terminals and servers, for example.

The input unit 120 is a touch panel, a keyboard or a mouse, for example. The display unit 130 is a display device used for input of various types of information. The display unit 130 is achieved by a liquid crystal display, for example. The information processing apparatus 100 according to the present embodiment is provided with the touch panel serving as the input unit 120. As a result, the input unit 120 and a part of the display unit 130 are integrated.

The control unit 140 is achieved by a central processing unit (CPU) or a micro processing unit (MPU) executing a program (corresponding to an example of an information processing program) stored in an internal storage device of the information processing apparatus 100 using an internal memory such as a random access memory (RAM) as a working area, for example.

As illustrated in FIG. 2, the control unit 140 includes an application control unit and a display control unit 160. The application control unit controls various applications and includes a memo pad application control unit 151 and a browser control unit 152.

The memo pad application control unit 151 executes an application capable of editing certain text. The browser control unit 152 executes an application that controls the display of websites. The control unit 140 may include an application control unit that executes and controls a mail function, and another application control unit that executes and controls a document preparation function besides the memo pad application control unit 151 and the browser control unit 152 illustrated in FIG. 2, for example.

The display control unit 160 executes and controls an application that achieves the processing described with reference to FIGS. 1A to 1E. As illustrated in FIG. 2, the display control unit 160 includes a switching detection unit 161, a cursor control unit 162, a moving operation detection unit 163, a display position change unit 164, and a range selection unit 165, and achieves or executes function or operation of information processing described below. The internal structure of the display control unit 160 is not limited to the structure illustrated in FIG. 2, and may be another structure that performs the information processing described later.

The switching detection unit 161 detects certain switching operation applied to the display unit 130 via the input unit 120, and switches to the selection mode in accordance with the detected switching operation. Specifically, the switching detection unit 161 detects the switching operation for switching a browsing mode in which no cursors are displayed or a cursor moving mode in which a single cursor is displayed and the displayed cursor can be moved (e.g., the state illustrated in FIG. 1A) to the selection mode for selecting a display object included in the display region AR1. The switching detection unit 161 also detects operation that cancels the selection mode and returns the mode to a certain mode.

When detecting a double tap performed on the display unit 130 as the switching operation for switching a current mode to the selection mode, the switching detection unit 161 switches the mode, which is one of the modes described above, to the selection mode, for example. When the mode has switched to the selection mode by the switching detection unit 161, the display position change unit 164, which is described later, enables text to be selected by moving the display position of the display region AR1 in accordance with the moving operation for moving the display region AR1 and controlling the positions of the cursors C11 and C12 in accordance with the movement.

The cursor control unit 162 executes various controls that display cursors on the basis of the user's operation performed on the display unit 130 and an instruction from the display position change unit 164, which is described later. Specifically, the cursor control unit 162 displays, in the display region AR1, another cursor (the cursor C12) different from the cursor (the cursor C11) displayed in the display region AR1 when the mode has switched to the selection mode by the switching detection unit 161. The cursor control unit 162 displays the cursor C12 at the same position as the cursor C11, for example.

The cursor control unit 162 may control not only the cursor C12 but also the cursor C11. When a touch operation performed on the text displayed in the display unit 130 is detected in the cursor moving mode in which only the cursor C11 is displayed, the cursor control unit 162 displays a cursor in an inter-character space nearest to the position where the touch operation is detected, for example.

When the switching operation is detected by the switching detection unit 161 in the browsing mode in which no cursors are displayed, the cursor control unit 162 may display two cursors at the position where the switching operation is detected, for example.

The moving operation detection unit 163 detects the moving operation for moving the display position of the display region AR1 displayed in the display unit 130. When moving operation that traces the display unit 130 with a finger, for example, is performed in the selection mode, the moving operation detection unit 163 detects the operation as the moving operation for moving the display region AR1, for example.

When the moving operation is detected by the moving operation detection unit 163, the display position change unit 164 moves the display position of the display region AR1 in accordance with the moving operation. When the moving operation detected by the moving operation detection unit 163 ends, the display position change unit 164 returns the display position of the display region AR1 to the display position before the movement.

Specifically, when the moving operation is detected by the moving operation detection unit 163 in the selection mode, the display position change unit 164 maintains one cursor of the cursors C11 and C12 near the original display position in the display unit 130 and moves the display position of the display region AR1 in accordance with the moving operation together with the other cursor. When the moving operation ends, the display position change unit 164 returns the display position of the display region AR1 to the display position before the movement together with the cursors displayed in the display region AR1.

For example, the moving operation is assumed to be detected by the moving operation detection unit 163 when the cursors C11 and C12 are displayed as illustrated in FIG. 1B. In this case, the display position change unit 164 moves the display position of the display region AR1 in accordance with the moving operation while maintaining the cursor C12 at the position (x1,y2) in the display unit 130 and the cursor C11 at the position (X1,Y2) in the display region AR1.

When the moving operation ends, the display position change unit 164 returns the display region AR1 to the original display position before the movement while maintaining the position of the cursor C12 in the display region AR1 and the position of the cursor C11 in the display region AR1. For example, the moving operation is assumed to end when the display region AR1 is moved as illustrated in FIG. 1D, the display position change unit 164 returns the display region AR1 to the original display position before the movement while maintaining the cursor C12 at the position (X3,Y4) in the display region AR1 and the cursor C11 at the position (X1,Y2) in the display region AR1.

In the present embodiment, as described above, when the display region AR1 is moved in accordance with the moving operation, the cursor C12 newly displayed by the cursor control unit 162 serves as the cursor maintained at the position in the display unit 130 whereas the cursor C11 serves as the cursor moved together with the display region AR1. The roles of the cursors are, however, not limited to this example. For example, the cursor C11 that is displayed before the mode has switched to the range selection mode may serve as the cursor maintained at the position in the display unit 130 while the cursor C12 newly displayed as a result of the detection of the switching operation may serve as the cursor moved together with the display region AR1.

The range selection unit 165 executes range selection processing that determines the selection range in text in accordance with the movement of the display region AR1 by the display position change unit 164. Specifically, the range selection unit 165 determines the region sandwiched between the cursors C11 and C12 to be the selection range in accordance with the movement of the display position of the display region AR1 by the display position change unit 164. The range selection unit 165 represents the selection range to the user by differentiating a background color of character strings displayed in the selection range from a background color of the other character strings.

The storage unit 170 is achieved by a semiconductor memory element such as a RAM and a flash memory, or a storage device such as a hard disk drive and an optical disc. The storage unit 170 stores therein text data, image data, which are displayed in the display unit 130, the cursor positions, and character strings in the selection range selected by the range selection unit 165, for example. The storage unit 170 includes a text storage unit 171, a cursor position storage unit 172, and a selection range storage unit 173.

The text storage unit 171 stores therein the text data displayed in the display unit 130. The cursor position storage unit 172 stores therein the positions of the cursors displayed in the display unit 130 in such a manner that the positions in the display unit 130 and in the display region AR1 are associated with each other for each cursor. The selection range storage unit 173 stores therein the positions of the cursors C11 and C12 that form the selection range determined by the range selection unit 165 and character strings in the selection range.

3. Explanation on Cursor Position (1)

Figure 3A:
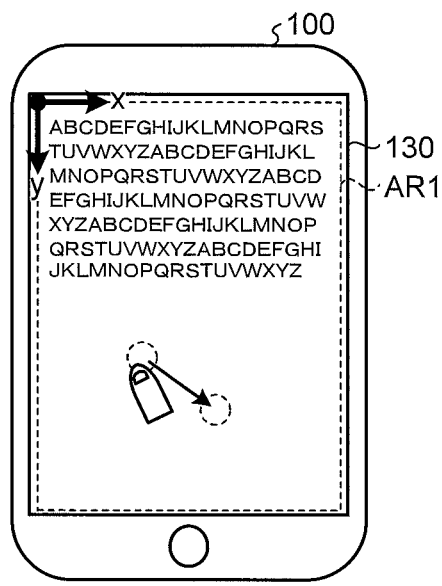
FIG. 3A is a schematic diagram illustrating an exemplary screen displayed by the information processing apparatus according to the embodiment.
Figure 3B:
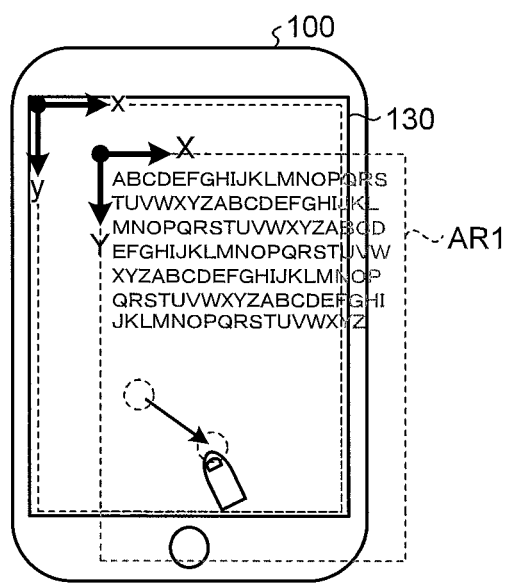
FIG. 3B is a schematic diagram illustrating another exemplary screen displayed by the information processing apparatus according to the embodiment.

The following describes the cursor position in the display unit 130 and the cursor position in the display region AR1 with reference to FIGS. 3A and 3B. FIGS. 3A and 3B are schematic diagrams illustrating exemplary screens displayed by the information processing apparatus 100 according to the present embodiment.

The coordinate system employing the upper left corner of the display region AR1 as the origin, the horizontal direction in the display unit 130 as the x axis, and the vertical direction in the display unit 130 as the y axis when the whole region of the display region AR1 is displayed in the display unit 130 as illustrated in FIG. 3A is called a display coordinate system. The coordinate system employing the upper left corner of the display region AR1 as the origin, the horizontal direction in the display region AR1 as the X axis, and the vertical direction in the display region AR1 as the Y axis as illustrated in FIG. 3B is called a region coordinate system. The display coordinate system is a fixed coordinate system that is not moved with respect to the display unit 130 whereas the region coordinate system is a moving coordinate system that is moved with respect to the display unit 130 in accordance with the movement of the display region AR1. The positions of the cursors in the display unit 130 are positions represented by the display coordinate system whereas the positions of the cursors in the display region AR1 are positions represented by the region coordinate system.

The following describes the cursor position in the range selection processing using the display coordinate system and the region coordinate system with reference to FIGS. 1A to 1E. When the switching operation is detected and the cursors C11 and C12 are displayed by the cursor control unit 162 as illustrated in FIG. 1B, the cursor position storage unit 172 stores therein the position of the cursor C11 in the display unit 130 as the position (x1,y2) represented by the display coordinate system, and the position of the cursor C11 in the display region AR1 as the position (X1,Y2) represented by the region coordinate system until the moving operation is detected by the moving operation detection unit 163. Until the moving operation is detected, the cursor position storage unit 172 also stores therein the position of the cursor C12 in the display unit 130 as the position (x1,y2) represented by the display coordinate system and the position of the cursor C12 in the display region AR1 as the position (X1,Y2) represented by the region coordinate system.

The origin of the display coordinate system and the origin of the region coordinate system coincide with each other until the moving operation is detected by the moving operation detection unit 163. As a result, the position (x1,y2) and the position (X1,Y2), which are the positions of the cursor C11, are the same position. Also for the cursor C12, the position (x1,y2) and the position (X1,Y2) are the same position.

The following describes a case where the display position change unit 164 moves the display region AR1 from the position P02 to the position P03 as illustrated in FIG. 10. During the movement of the display region AR1, the display position change unit 164 displays the cursor C12 in the display unit 130 on the basis of the position (x1,y2) of the cursor C12 in the display unit 130 before the movement of the display region AR1. During the movement of the display region AR1, the display position change unit 164 continuously calculates the position of the cursor C11 in the display unit 130 in accordance with an amount of the movement, and displays the cursor C11 at the calculated position in accordance with the calculation result. The cursor position storage unit 172 stores therein the position (X1,Y2) represented by the region coordinate system as the position of the cursor C11 in the display region AR1.

When moving the display region AR1 to the position P03, the display position change unit 164 calculates the position of the cursor C12 in the display region AR1 after the movement in accordance with an amount of the movement, and causes the cursor position storage unit 172 to store therein the position of the cursor C12 in the display region AR1 after the movement. In the example illustrated in FIG. 1D, the cursor position storage unit 172 stores therein the position (X3,Y4) represented by the region coordinate system as the position of the cursor C12 in the display region AR1.

With regard to the cursor C12, the position (x1,y2) and the position (X3,Y4) differ from each other because the display position of the display region AR1 is moved by the display position change unit 164. The position of the cursor C12 in the display region AR1 is moved. With regard to the cursor C11, the position (x3,y4) and the position (X1,Y2) differ from each other. The position of the cursor C11 in the display unit 130 is moved.

The following describes a case where the display position change unit 164 returns the display region AR1 to the display position before the moving operation as illustrated in FIG. 1E. In this case, the display position change unit 164 causes the cursor position storage unit 172 to store therein the position (X3,Y4) of the cursor C12 in the display region AR1 as the position of the cursor C12 in the display unit 130. The cursor position storage unit 172 stores therein the position (x5,y6) represented by the display coordinate system as the position of the cursor C12 in the display unit 130. The display position change unit 164 returns the display region AR1 to the display position before the moving operation, thereby displaying the cursor C12 at the position (x5,y6) in the display unit 130. As a result, the position of the cursor C12 in the display unit 130 is moved to the position (x5,y6) from the position (x1,y2).

The display position change unit 164 causes the cursor position storage unit 172 to store therein the position (X1,Y2) of the cursor C11 in the display region AR1 as the position of the cursor C11 in the display unit 130. The cursor position storage unit 172 stores therein the position (x1,y2) represented by the display coordinate system as the position of the cursor C11 in the display unit 130. The display position change unit 164 returns the display region AR1 to the display position before the moving operation, thereby displaying the cursor C11 at the position (x1,y2) in the display unit 130. As a result, the position of the cursor C11 in the display unit 130 is moved to the position (x1,y2) from the position (x3,y4).

The end of the moving operation may be detected by the moving operation detection unit 163, and the moving operation detection unit 163 may notify the display position change unit 164 of the detection of the end. Alternatively, the moving operation detection unit 163 may continuously notify the display position change unit 164 of the detection of the moving operation during the detection of the moving operation, and the display position change unit 164 may determine that the moving operation ends when no more receiving such notification. With regard to the start and the end of the moving operation, it may be determined to be the start of the moving operation when a finger of the user touches the display unit 130 whereas it may be determined to be the end of the moving operation when the finger of the user is released from the display unit 130. Alternatively, the moving operation may start or end when a certain operation such as a touch operation is received from the user.

3. Explanation on Cursor Position (2)

In the example described above, when the display region AR1 is moved in the selection mode, the display position of the display region AR1 is moved together with the cursor C11 in accordance with the moving operation while the position of the cursor C12 is maintained at the original display position before the movement in the display unit 130. When moving the display position of the display region AR1 in accordance with the moving operation, the display position change unit 164 does not strictly maintain the position of the cursor C12 at the original display position before the movement in the display unit 130, but slightly moves the position in accordance with the moving operation, and thereafter moves the display region AR1 such that the cursor C12 is positioned in an inter-character space nearest to the original display position before the movement.

The following describes such cursor positioning processing with reference to FIGS. 1A to 1E. For example, when moving the display position of the display region AR1 in accordance with the moving operation in the upper left direction as illustrated in FIG. 1C, the display position change unit 164 does not maintain the position of the cursor C12 at the position (x1,y2), which is the original display position before the movement in the display unit 130, but slightly moves the position of the cursor C12 in the left upper direction as if the position follows the moving direction in the upper left direction. Specifically, the display position change unit 164 slightly moves the cursor C12 in the upper left direction together with the display region AR1 in accordance with the moving operation, and thereafter moves the display region AR1 such that the cursor C12 is positioned in an inter-character space nearest to the position (x1,y2), which is the original display position.

A certain value may be preliminarily set to the information processing apparatus 100 as an amount of the movement of the cursor C12 moved together with the display region AR1. For example, the display position change unit 164 may perform the processing to move the display region AR1 as follows: the display position change unit 164 moves the cursor C12 together with the display region AR1 in accordance with the moving operation until the movement amount of the cursor C12 exceeds half the size of the character adjacent to the cursor C12 in the moving direction of the display region AR1, and when the movement amount of the cursor C12 exceeds half the size of the character, moves the display region AR1 such that the cursor C12 is positioned in an inter-character space nearest to the original display position before the movement.

In the present embodiment, maintaining the position of the cursor C12 (or the cursor C11) in the display unit 130 at the original display position when the display region AR1 is moved does not only mean maintaining the position of the cursor C12 at the original display position but also includes a concept that the position of the cursor C12 is maintained at a certain position in a certain range from or near the original display position.

4. Processing Procedure

Figure 4:
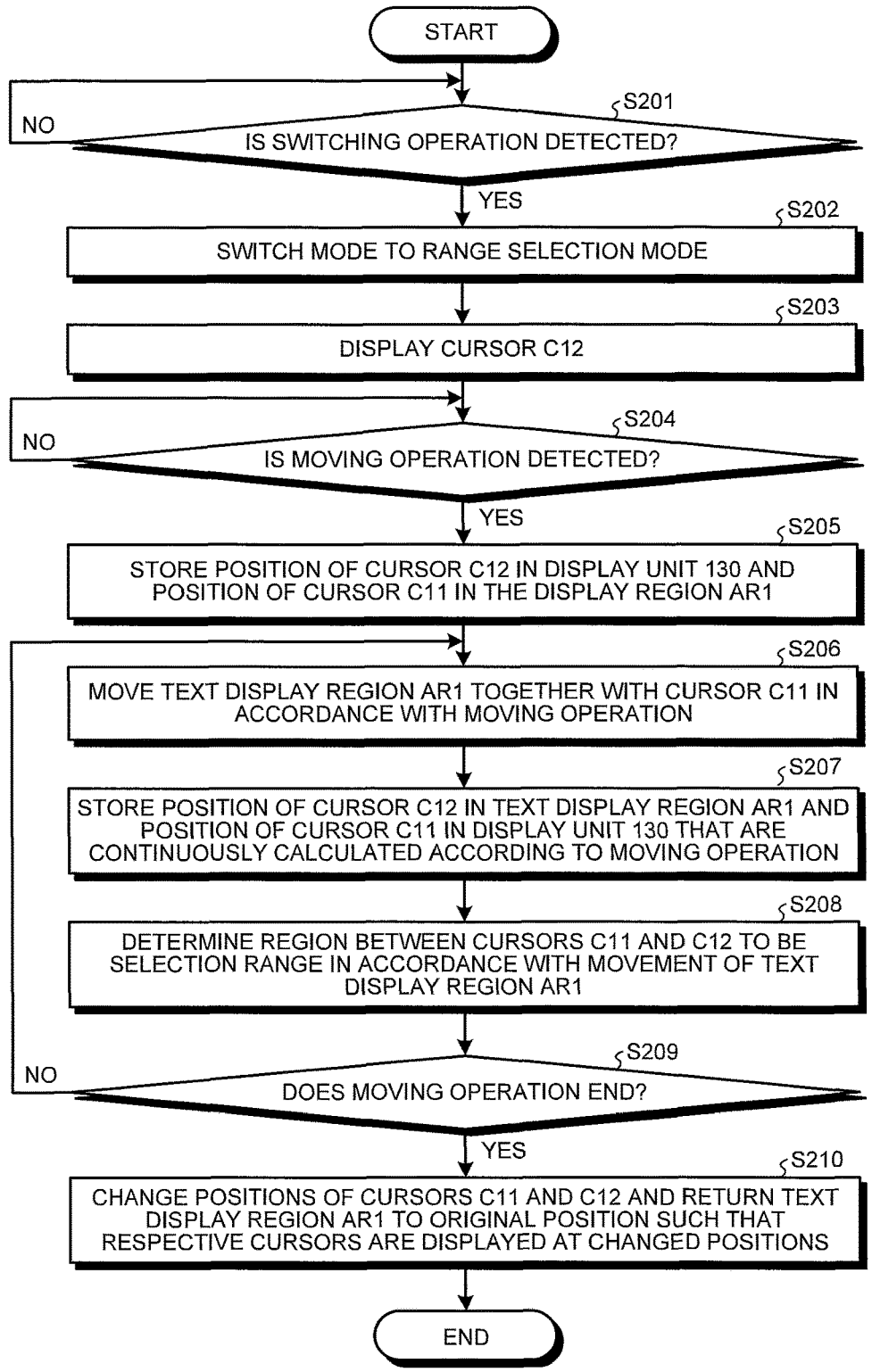
FIG. 4 is a flowchart illustrating an exemplary procedure of range selection processing according to the embodiment.

The following describes the procedure of range selection processing according to the present embodiment with reference to FIG. 4. FIG. 4 is a flowchart illustrating an exemplary procedure of the range selection processing according to the present embodiment.

As illustrated in FIG. 4, the switching detection unit 161 determines whether certain switching operation (e.g., a double tap performed on the text displayed in the display unit 130) for switching the cursor moving mode to the selection mode is detected in the cursor moving mode in which the cursor C11 is displayed, for example (step S201). If no switching operation is detected (No at step S201), the switching detection unit 161 waits for the switching operation to be detected. If the switching operation is detected (Yes at step S201), the switching detection unit 161 switches the cursor moving mode to the selection mode (step S202). When detecting the switching operation, the switching detection unit 161 notifies the cursor control unit 162 of the detection of the switching operation as the processing to switch the cursor moving mode to the selection mode, for example. The switching detection unit 161 causes, as the selection mode, the display position change unit 164 to be able to move the display region AR1 in accordance with the moving operation for moving the display region AR1 while controlling the positions of the respective cursors.

When the switching operation is detected by the switching detection unit 161, the cursor control unit 162 displays the cursor C12 at the same position as the cursor C11 (step S203).

Under such a state, the moving operation detection unit 163 determines whether the moving operation for moving the display region AR1 is detected (step S204). If no moving operation is detected (No at step S204), the moving operation detection unit 163 waits for the moving operation to be detected. If the moving operation is detected (Yes at step S204), the moving operation detection unit 163 causes the cursor position storage unit 172 to store therein the display position of the cursor C12 before the movement in the display unit 130 and the display position of the cursor C11 before the movement in the display region AR1 (step S205). The processing may be performed by the display position change unit 164. The moving operation detection unit 163 consistently notifies the display position change unit 164 of the detection of the moving operation during the detection of the moving operation.

The display position change unit 164 moves the display position of the display region AR1 in accordance with the moving operation together with the cursor C11 while maintaining the cursor C12 at the position before the movement in the display unit 130 (step S206). The display position change unit 164 continuously calculates the position of the cursor C11 in the display unit 130 from the moving amount according to the moving operation, and displays the cursor C11 at the calculated position. The display position change unit 164 continuously calculates the position of the cursor C12 in the display region AR1 from the moving amount according to the moving operation while the cursor C12 is displayed at the display position before the movement in the display unit 130. The cursor position storage unit 172 stores therein the thus calculated values for the cursors C11 and C12 (step S207).

The range selection unit 165 determines the region between the cursors C11 and C12 to be the selection range in accordance with the movement of the display position of the display region AR1 by the processing at step S206 (step S208). The range selection unit 165 highlights the selection range by differentiating a background color of character strings displayed in the selection range from a background color of the other character strings.

The moving operation detection unit 163 determines whether the moving operation ends (step S209). If the moving operation does not end (No at step S209), the moving operation detection unit 163 returns to step S206. If the moving operation ends (Yes at step S209), the display position change unit 164 changes the position of the cursor C12 in the display region AR1 to the corresponding position of the cursor C12 in the display unit 130, and the position of the cursor C11 in the display region AR1 to the corresponding position of the C11 in the display unit 130. The display position change unit 164 returns the display position of the display region AR1 to the display position before the moving operation such that the cursors C11 and C12 are displayed at the changed positions (step S210). The range selection unit 165 maintains the region between the cursors C11 and C12 to be selected even when the display position of the display region AR1 is returned to the display position before the moving operation.

5. Modifications

The information processing apparatus 100 according to the present embodiment may be achieved in various forms besides the present embodiment described above. The following describes other embodiments of the information processing apparatus 100.

5-1. Range Selection Processing (1)

In the example described in the present embodiment, when the switching operation for switching a current mode to the selection mode is detected, the cursor control unit 162 of the information processing apparatus 100 displays the cursor C12 at the same position as the cursor C11 displayed in the display region AR1 regardless of the detection position where the switching operation is detected. When the switching operation is detected, the cursor control unit 162 may display the cursor C12 at the detection position where the switching operation is detected. When the moving operation for moving the display region AR1 is detected, the display position change unit 164 moves the display position of the display region AR1 together with the cursor C11 in accordance with the moving operation while maintaining the cursor C12 at the detection position where the switching operation is detected and that is in the display unit 130. The following describes the processing with reference to FIGS. 5A and 5B.

Figure 5A:
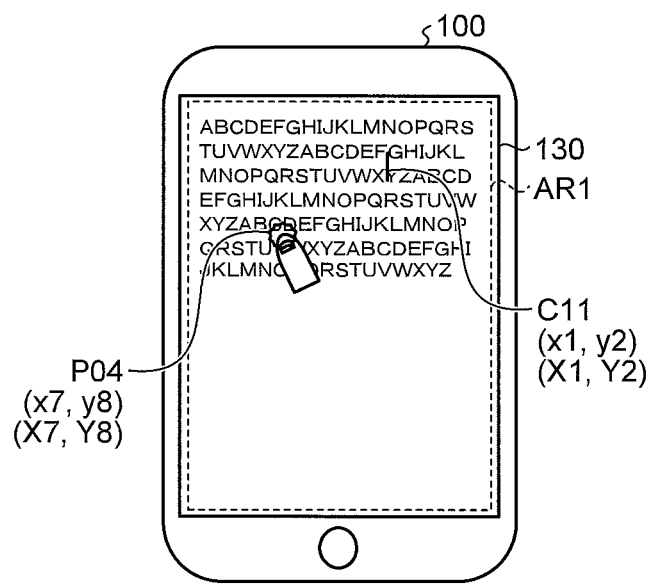
FIGS. 5A and 5B are schematic diagrams illustrating an example of the range selection processing according to a modification.
Figure 5B:
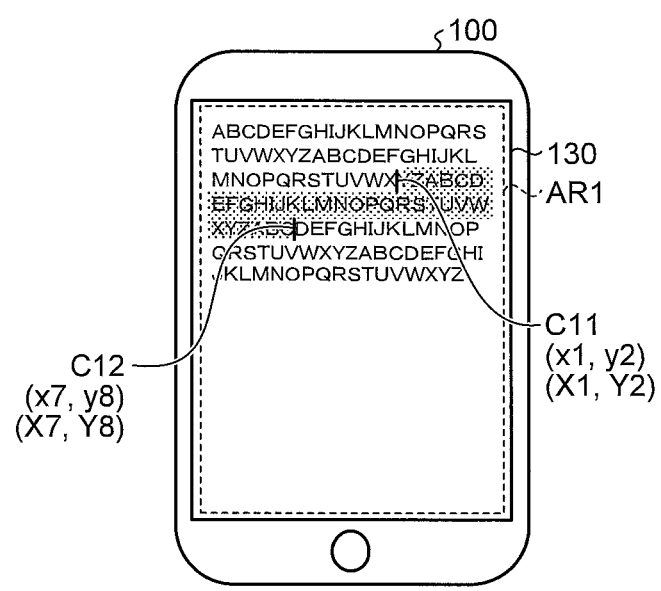

FIGS. 5A and 5B are schematic diagrams illustrating an example of the range selection processing according to a modification. It is assumed that the cursor C11 is displayed between "X" and "Y" in the third line of the text as illustrated in FIG. 5A. The position of the cursor C11 in the display unit 130 is the position (x1,y2) whereas the position of the cursor C11 in the display region AR1 is the position (X1,Y2).

It is assumed that a user performs a double tap at the position between "C" and "D" in the fifth line in the text as the switching operation for switching the current mode to the selection mode. When detecting the double tap, the switching detection unit 161 switches a current mode to the selection mode and notifies the cursor control unit 162 of a detection position P04 where the double tap is detected. It is assumed that the position of the detection position P04 in the display unit 130 is the position (x7,y8) while the position of detection position P04 in the display region AR1 is the position (X7,Y8). The switching detection unit 161 notifies the cursor control unit 162 of both of the position (x7,y8) in the display unit 130 and the position (X7,Y8) in the display region AR1 as information about the detection position P04.

When receiving the detection position, the cursor control unit 162 displays the cursor C12 at the position (x7,y8) in the display unit 130. At this time, no moving operation is performed. As a result, the origin of the display coordinate system and the origin of the region coordinate system coincide with each other. The position (x7,y8) and the position (X7,Y8) are, thus, the same position. When receiving the detection position, the cursor control unit 162 may display the cursor C12 at the position (X7,Y8) in the display region AR1.

The range selection unit 165 determines the region sandwiched between the cursors C11 and C12 to be the selection range, and highlights the selection range by differentiating a background color of character strings displayed in the selection range from a background color of the other character strings.

When the moving operation is detected under such a state, the display position change unit 164 moves the display position of the display region AR1 in accordance with the moving operation while maintaining the cursor C12 at the position (x7,y8) in the display unit 130 and the cursor C11 at the position (X1,Y2) in the display region AR1.

In this way, when the switching operation is detected, the information processing apparatus 100 displays, in the display region AR1, the cursor (the cursor C12) different from the cursor (the cursor C11) displayed in the display region AR1 at the detection position where the switching operation is detected.

When the cursors C12 and C11 are displayed at the same position, the two cursors are completely overlapped with each other, thereby causing a user to feel that no change has occurred in appearance in some cases, for example. It is difficult for the user to recognize that the two cursors are displayed. The user, thus, hardly recognizes whether the mode has switched to the range selection mode in some cases. The information processing apparatus 100 can display the second cursor C12 at the position the user touches by the processing described above, thereby making it possible for the user to easily recognize that the mode has switched to the range selection mode. The information processing apparatus 100 can also display the cursor C12 at the user's desired position, thereby making it possible to enhance the usability.

5-2. Range Selection Processing (2)

The cursor control unit 162 may display the cursor different from the cursor displayed in the display region AR1 and thereafter move any one of the two cursors displayed in the display region AR1 to a designated position designated by the user in the display region AR1. When the moving operation for moving the display region AR1 is detected, the display position change unit 164 maintains the moved cursor at the designated position, which correspond to the position designated by the user in the display region AR1, in the display unit 130 or a certain position near the designated position in the display unit 130, and moves the display position of the display region AR1 together with the other cursor in accordance with the moving operation. The following describes the processing with reference to FIGS. 6A and 6B.

Figure 6A:
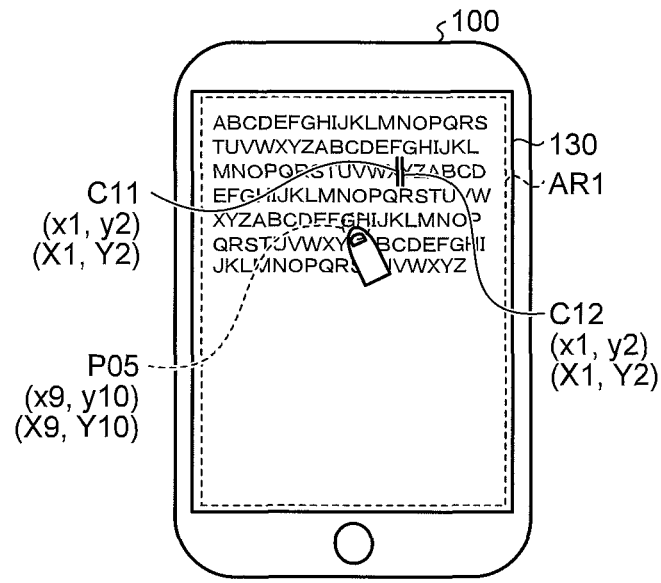
FIGS. 6A and 6B are schematic diagrams illustrating an example of the range selection processing according to another modification.
Figure 6B:
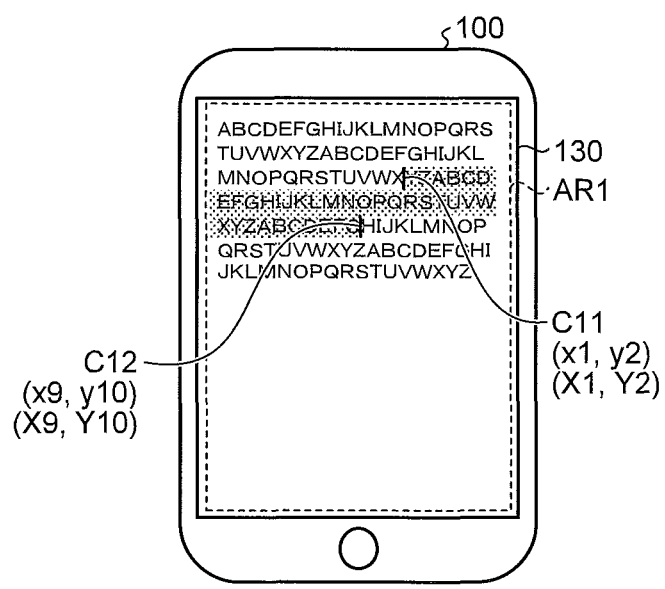

FIGS. 6A and 6B are schematic diagrams illustrating an example of the range selection processing according to another modification. FIG. 6A illustrates a state where the cursor control unit 162 displays the cursor C12 at the same position as the cursor C11 in accordance with the detection of the switching operation for switching a current mode to the selection mode. As described in the modification 5-1, the cursor control unit 162 may display the cursor C12 at the detection position where the switching operation is detected.

It is assumed that a user touches (e.g., performs single tap operation) on the position between "G" and "H" in the fifth line in the text to designate the touch position. The cursor control unit 162, thus, identifies the position of a designated position P05, which is designated by the user. FIG. 6A illustrates that the cursor control unit 162 identifies, as the designated position P05, the position (x9,y10) in the display unit 130 and the position (X9,Y10) in the display region AR1.

The cursor control unit 162 moves the cursor C12 to the position (x9,y10) in the display unit 130 with the determination of the position being the specified designated position P05, for example. At this time, no moving operation is performed. As a result, the origin of the display coordinate system and the origin of the region coordinate system coincide with each other. The position (x9,y10) and the position (X9,Y10) are, thus, the same position. The cursor control unit 162 may move the cursor C12 to the position (X9,Y10) in the display region AR1 with the determination of the position being the specified designated position P05. In the example described above, the cursor control unit 162 moves the cursor C12 to the position on which the single tap is performed. The cursor control unit 162 may move the cursor C11 to the position.

The range selection unit 165 determines the region sandwiched between the cursors C11 and C12 to be the selection range, and highlights the selection range by differentiating a background color of character strings displayed in the selection range from a background color of the other character strings.

When the moving operation is detected under such a state, the display position change unit 164 moves the display position of the display region AR1 in accordance with the moving operation while maintaining the cursor C12 at the position (x9,y10) in the display unit 130 and the cursor C11 at the position (X1,Y2) in the display region AR1.

In this way, the information processing apparatus 100 moves any one of the cursors to the position designated by the user when the mode is the selection mode. The information processing apparatus 100, thus, allows the user to move the ending point (in this case, the cursor C12) of the selection range to a rough position and thereafter to perform fine adjustment on the ending point by moving the display position of the display region AR1. Consequently, the information processing apparatus 100 can enhance the usability.

There is a case where the user wants to perform range selection by designating a certain position and moving the cursor C12 to the position as described in the example in the selection mode. There is another case where the user wants to perform range selection by moving the display region AR1 in the selection mode, thereby moving the cursor C12. Both cases require the operation to touch the display unit 130 first. The information processing apparatus 100 needs to distinguish whether the operation of touching the display unit 130 is the single tap operation for designating the position to which the cursor C12 is moved or an initial operation for moving the display region AR1.

The information processing apparatus 100 may perform the differentiation on the basis of a time period in which the user touches the display unit 130, for example. For example, the cursor control unit 162 determines that the user wants to move the cursor C12 to a certain position when the operation of touching a certain position in the display unit 130 takes a certain time period, and moves the cursor C12 to the certain position. When the operation of touching a certain position in the display unit 130 takes a certain time period, the moving operation detection unit 163 determines that the operation is an initial operation for moving the display region AR1.

The manner to move the cursor C12 is not limited to the example. For example, the cursor control unit 162 may move only the cursor C12 displayed first at the same position as the cursor C11 to the position the user touches, as the selection mode. When the display region AR1 is returned to the display position before the movement in the state where the range is already selected as illustrated in FIG. 6B, the cursor control unit 162 may make it possible to move the cursor C12 on the basis of the movement of the display region AR1 based on the moving operation by the display position change unit 164 without the movement of the cursor C12 based on the position designation.

5-3. Range Selection Processing (3)

Figure 7A:
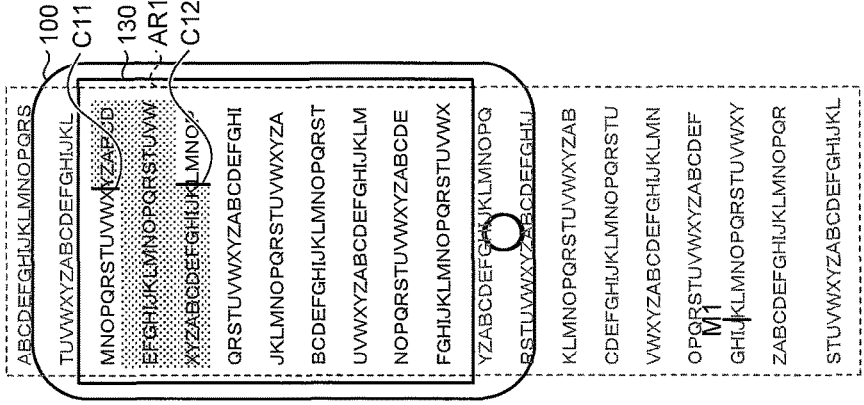
FIGS. 7A to 7C are schematic diagrams illustrating an example of movement of a display region.
Figure 7B:
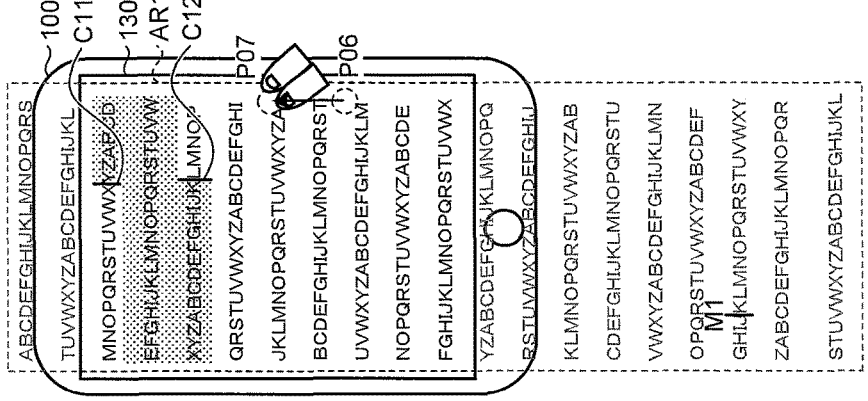
Figure 7C:
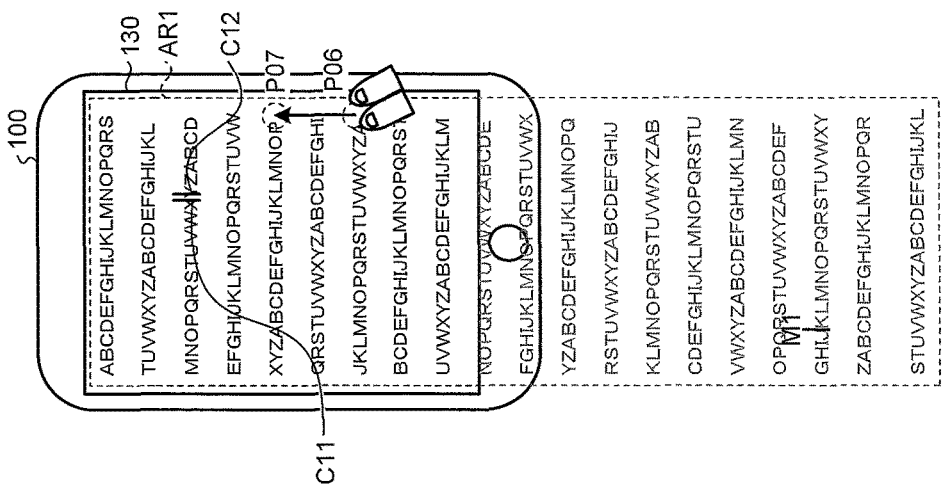

FIGS. 7A to 7C are schematic diagrams illustrating an example of the movement of the display region AR1 in the selection mode. In the embodiments described above, the size of the display region AR1 is the same as that of the display unit 130. In this modification, the longitudinal size of the display region AR1 is longer than that of the display unit 130 as illustrated in FIGS. 7A to 7C.

The moving operation detection unit 163 detects the moving operation for moving the display region AR1 by distinguishing first moving operation and second moving operation in the range selection mode. When the first moving operation is detected, the display position change unit 164 moves the display region AR1 in accordance with the first moving operation, and, when the first moving operation ends, maintains the display region AR1 at the display position at the time when the first moving operation ends without returning the display position of the display region AR1 to the position before the movement. When the second moving operation is detected, the display position change unit 164 moves the display region AR1 in accordance with the second moving operation, and, when the second moving operation ends, returns the display position of the display region AR1 to the position before the movement. The following describes the processing with reference to FIGS. 7A to 7C. In the modification, the first moving operation is the moving operation with two fingers (in some cases simply mentioned as two fingers) whereas the second moving operation is the moving operation with a single finger. The processing is described with reference to FIGS. 7A to 7C.

FIGS. 7A to 7C are schematic diagrams illustrating an example of the movement of the display region AR1. FIG. 7A illustrates a state where the cursor control unit 162 displays the cursor C12 at the same position as the cursor C11 in accordance with the detection of the switching operation for switching a current mode to the selection mode. It is assumed that a user performs sliding operation from a position P06 to a position P07 while touching the display unit 130 with two fingers for moving the display region AR1 as illustrated in FIG. 7A.

The moving operation detection unit 163 determines whether a single finger or two fingers are touched on the display unit 130. For example, when determining that two fingers are touched on the display unit 130 and detecting the moving operation for moving the display region AR1 with the two fingers, the moving operation detection unit 163 notifies the display position change unit 164 of the detection. In the example illustrated in FIG. 7A, the moving operation detection unit 163 notifies the display position change unit 164 of the implementation of the moving operation with two fingers.

It is assumed that the display position change unit 164 moves the display position of the display region AR1 from the position illustrated in FIG. 7A to the position illustrated in FIG. 7B in accordance with the moving operation with two fingers. At the time when the display position of the display region AR1 is moved to the position illustrated in FIG. 7B, the end of the moving operation is assumed to be detected by the moving operation detection unit 163 as a result of at least one of the two fingers being released from the display unit 130, for example.

When the moving operation with the two fingers ends, the display position change unit 164 maintains the display position of the display region AR1 at the display position moved according to the moving operation with the two fingers without returning the display position of the display region AR1 to the position before the movement, as illustrated in FIG. 7C. The display position change unit 164 maintains the display position of the display region AR1 at the position illustrated in FIG. 7B after the moving operation with two fingers ends.

For example, when determining that a single finger is touched on the display unit 130 and detecting the moving operation for moving the display region AR1 with the finger, the moving operation detection unit 163 notifies the display position change unit 164 of the detection.

The display position change unit 164, thus, moves the display position of the display region AR1 in accordance with the moving operation with the finger. It is assumed that the display position change unit 164 moves the display position of the display region AR1 from the position illustrated in FIG. 7A to the position illustrated in FIG. 7B in accordance with the moving operation with the finger. At the time when the display position of the display region AR1 is moved to the position illustrated in FIG. 7B, the end of the moving operation is assumed to be detected by the moving operation detection unit 163 as a result of the finger being released from the display unit 130, for example. The display position change unit 164 returns the display position of the display region AR1 to the position before the movement. The processing performed by the information processing apparatus 100 when the moving operation with a single finger is performed is the same as the processing described with reference to FIGS. 1A to 1E, for example.

In this way, when the first moving operation ends, the information processing apparatus 100 maintains the display position of the display region AR1 moved according to the first moving operation at the position after the movement without returning the display position of the display region AR1 to the position before the movement. When the second moving operation ends, the information processing apparatus 100 returns the display position of the display region AR1 moved according to the second moving operation to the position before the movement.

It is assumed that the user wants to select a range from "Y" in the third line to "J" in the 18th line in the text while browsing the sentences displayed in the display region AR1. In this case, the user may repeat the moving operation several times until a position M1 reaches the position of the cursor C12 illustrated in FIG. 7A. When the moving operation with two fingers is performed, the information processing apparatus 100 can maintain the display position of the display region at the position after the movement as a result of the moving operation without returning the display position of the display region to the position before the movement, thereby making it possible to perform a wide range selection from a text, which requires the moving operation several times.

The information processing apparatus 100 allows the user to set the selection range at will by causing the user to properly use the different types of moving operations, and to freely browse the text without returning the display position of the display region to the position before the movement even in the selection mode.

5-4 Setting Cursor Position

The display position change unit 164 moves the display region AR1 in accordance with the moving operation such that the cursor is positioned at a certain position in characters included in the display region AR1. Specifically, when a moving amount of the display region AR1 according to the moving operation is larger than a certain value, the display position change unit 164 moves the display region AR1 such that the cursor is positioned near the original display position in the display unit 130 and between morphemes in the display region AR1. When a moving amount of the display region AR1 according to the moving operation is smaller than the certain value, the display position change unit 164 moves the display region AR1 such that the cursor is positioned near the original display position in the display unit 130 and in an inter-character space in the display region AR1. The following describes the processing with reference to FIGS. 8A and 8B.

Figure 8B:
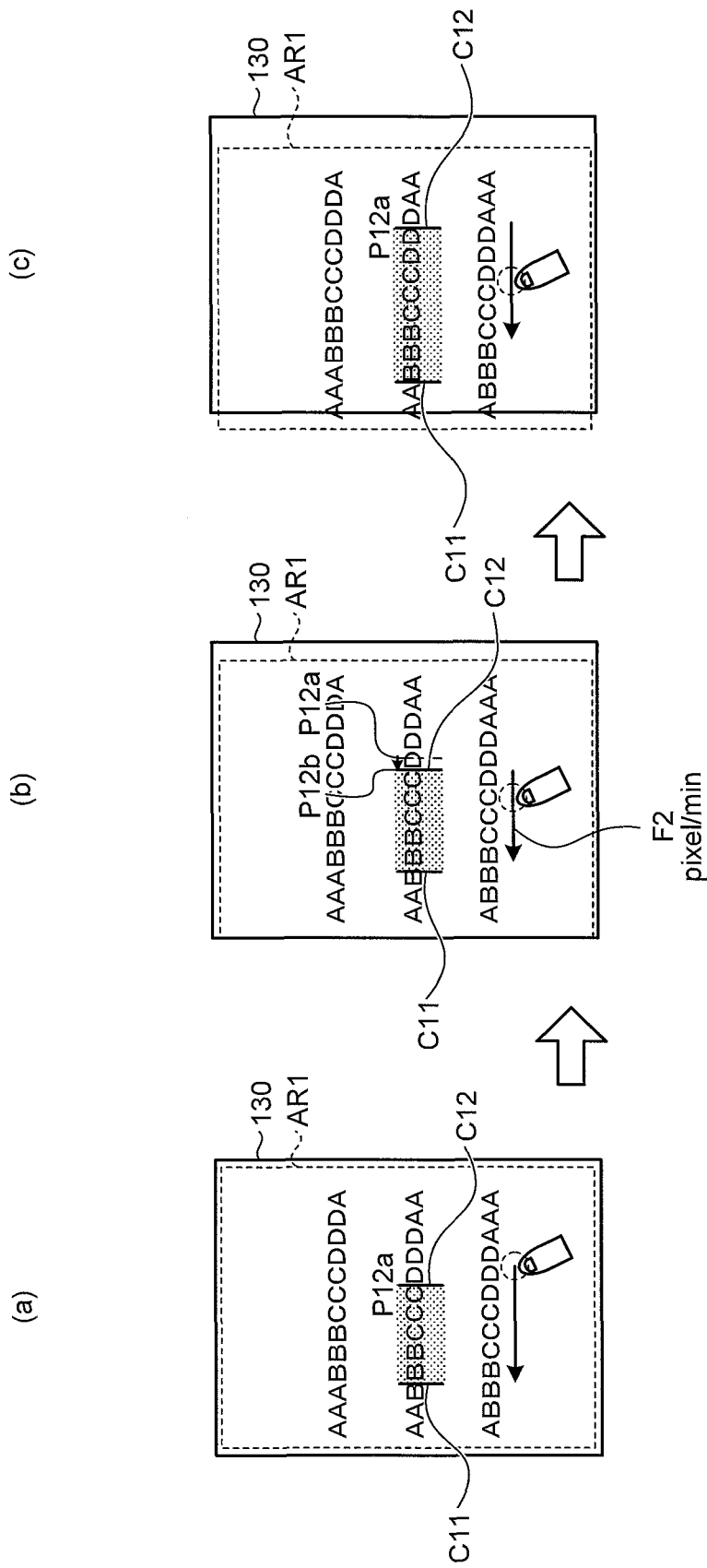
FIG. 8B is another schematic diagram explaining the cursor position according to the movement of the display region.

FIGS. 8A and 8B are schematic diagrams explaining the cursor position according to the movement of the display region AR1. In FIGS. 8A and 8B, a set of identical alphabet (e.g., "AAA" or "BBB") is a morpheme. An example is illustrated in (a) of FIG. 8A where the cursor C11 is positioned between the first "B" and the second "B" in the second line in the text whereas the cursor C12 is positioned between "C" and "D" in the second line in the text. The position of the cursor C12 in the display unit 130 is a position P12a.

It is assumed that the user performs the moving operation for moving the display position of the display region AR1 in the left direction as illustrated in (b) of FIG. 8A from (a) in FIG. 8A. When the moving operation is detected by the moving operation detection unit 163, the display position change unit 164 moves the display position of the display region AR1 together with the cursor C11 in accordance with the moving operation while maintaining the cursor C12 at the position P12a in the display unit 130.

The display position change unit 164 moves the display position of the display region AR1, continuously calculates the moving amount of the display region AR1, and determines whether the calculated value is larger or smaller than a certain value for each calculation. The moving amount is a moving amount of the display region AR1 per unit time, i.e., a moving speed of the display region AR1, for example.

As illustrated in (b) of FIG. 8A, the display position change unit 164 calculates "F1 (pixel/min)" as the moving amount of the display region AR1 and is assumed to determine that the calculated F1 (pixel/min) is larger than a certain value. In the same manner as described in "3. Explanation of cursor position (2)", the display position change unit 164 does not maintain the cursor C12 strictly at the position P12a in the display unit 130, but moves the cursor C12 to a position P12b in the display unit 130 together with the display region AR1 in accordance with the movement of the display region AR1 in the left direction as illustrated in (b) of FIG. 8A. The moving distance (the distance between the position P12a and the position P12b) of the cursor C12 may be a predetermined certain value or a distance corresponding to half the character size.

The display position change unit 164 moves the cursor C12 to the position P12b, and thereafter returns the cursor C12 to the position P12a. Because the display position change unit 164 determines that the moving amount "F1 (pixel/min)" of the display region AR1 is larger than a certain value, the display position change unit 164 returns the cursor C12 to the position P12a and moves the display region AR1 such that the cursor C12 is positioned between the morpheme "DDD" and the morpheme "AAA" continuing to the morpheme "DDD", as illustrated in (c) of FIG. 8A.

With reference to FIG. 8A, the processing performed by the display position change unit 164 is described when the moving amount of the display region AR1 is larger than the certain value. With reference to FIG. 8B, the following describes the processing performed by the display position change unit 164 when the moving amount of the display region AR1 is smaller than the certain value.

An example is illustrated in (a) of FIG. 8B where the cursor C11 is positioned between the first "B" and the second "B" in the second line in the text whereas the cursor C12 is positioned between "C" and "D" in the second line in the text. The position of the cursor C12 in the display unit 130 is the position P12a.

It is assumed that the user performs the moving operation for moving the display position of the display region AR1 in the left direction as illustrated in (b) of FIG. 8B from (a) in FIG. 8B. The display position change unit 164 moves the display position of the display region AR1, continuously calculates the moving amount of the display region AR1, and determines whether the calculated value is larger or smaller than the certain value for each calculation.

As illustrated in (b) of FIG. 8B, the display position change unit 164 calculates "F2 (pixel/min)" as the moving amount of the display region AR1 and is assumed to determine that the calculated F2 (pixel/min) is smaller than the certain value.

The display position change unit 164 does not maintain the cursor C12 at the position P12a in the display unit 130, but slightly moves the cursor C12 to the position P12b in the display unit 130 together with the display region AR1 in accordance with the movement of the display region AR1 in the left direction as illustrated in (b) of FIG. 8B.

The display position change unit 164 moves the cursor C12 to the position P12b, and thereafter returns the cursor C12 to the position 212a. Because the display position change unit 164 determines that the moving amount "F2 (pixel/min)" of the display region AR1 is smaller than the certain value, the display position change unit 164 returns the cursor C12 to the position P12a and moves the display region AR1 such that the cursor C12 positioned between "C" and "D" before the movement is positioned between the first "D" and the second "D", i.e., between the characters as illustrated in (c) of FIG. 8B.

In this way, when a moving amount of the display region AR1 moved according to the moving operation is larger than a certain value, the information processing apparatus 100 moves the display region AR1 such that the cursor C12 is positioned between morphemes in the display region AR1 while maintaining the cursor C12 at the display position before the movement in the display unit 130. When a moving amount of the display region AR1 moved according to the moving operation is smaller than the certain value, the information processing apparatus 100 moves the display region AR1 such that the cursor C12 is positioned between characters in the display region AR1 while maintaining the cursor C12 at the display position before the movement in the display unit 130.

There is a case where the user wants to edit text on a word or morpheme basis, for example. The information processing apparatus 100 can move the display region AR1 such that the cursor is positioned for each of the morphemes in the display region AR1, thereby making it possible to enhance the degree of satisfaction of the user to the text editing. There is a case where the user wants to edit text on a sentence or any character string basis, for example. The information processing apparatus 100 can move the display region AR1 such that the cursor is positioned for each of the characters in the display region AR1, thereby making it possible to enhance the degree of satisfaction of the user to the text editing.

5-5 Highlighting

When moving the display position of the display region AR1 in accordance with the moving operation, the display position change unit 164 highlights the surroundings of any one of the cursors in the display region AR1. The following describes the processing with reference to FIG. 9.

Figure 9:
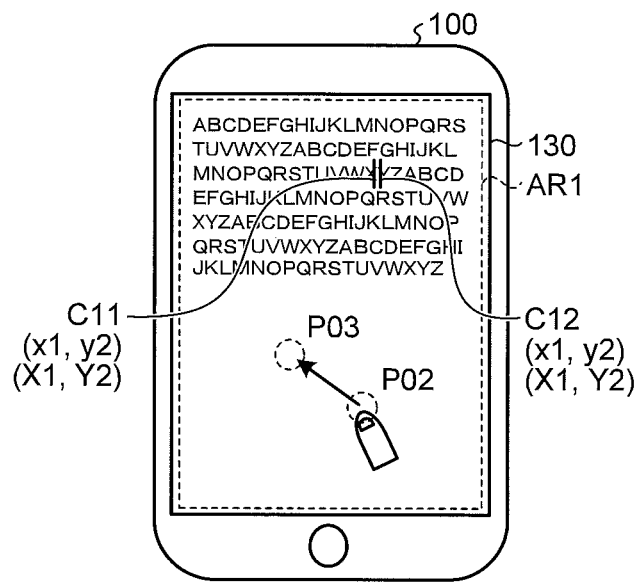
FIG. 9 is a schematic diagram illustrating an example of highlighting surroundings of the cursor.
Figure 9:
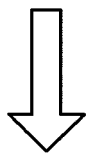
Figure 9:
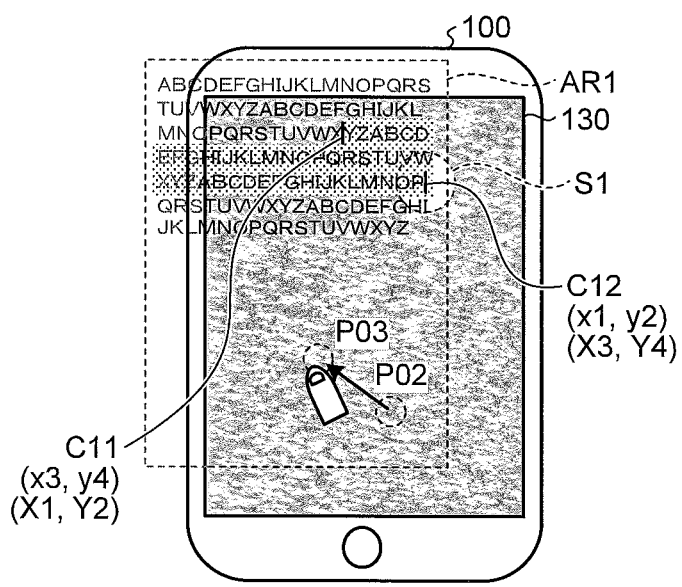

FIG. 9 is a schematic diagram illustrating an example of highlighting the surroundings of the cursor. As illustrated in FIG. 9, the display position change unit 164 moves the display position of the display region AR1 in accordance with the moving operation for moving the display region AR1 from the position P02 to the position P03 while maintaining the cursor C12 at the position (x1,y2) in the display unit 130 and the cursor C11 at the position (X1,Y2) in the display region AR1.

The cursor C11 is consistently maintained at the position (X1,Y2) in the display region AR1. As a result, the user does not need to pay attention to the cursor C11 in the range selection. The position of the cursor C12 in the display unit 130 is maintained at the position (x1,y2) whereas the position of the cursor C12 in the display region AR1 is changed with the movement of the display region AR1. The user, thus, pays attention to the cursor C12, and determines the selection range by performing the moving operation such that the cursor C12 is moved to any position.

In view of such situations, the display position change unit 164 reduces luminance of the display unit 130 excluding a surrounding region S1 of the cursor C12 or contrast of the display unit 130 excluding the surrounding region S1 with the surrounding region S1 such that the surrounding region S1 is highlighted during the detection of the moving operation of the display region AR1, as illustrated in FIG. 9. As a result, the user does not lose sight of the cursor C12 to which the user needs to pay attention for range selection.

The display position change unit 164 may magnify and display characters included in the surrounding region S1 of the cursor C12 or the cursor C12, or display an arrow, for example, on the cursor C12 to clearly indicate the position of the cursor C12 during the detection of the moving operation of the display region AR1. Those displays are not illustrated here.

5-6 Cursor Moving Mode

In the present embodiment described above, when the switching operation for switching the current mode to the selection mode is detected, the cursor control unit 162 displays the cursor C12 different from the cursor C11 displayed in the display region AR1. The following describes processing that determines the position of the cursor C11 by moving the cursor C11 serving as the starting point of the range selection before the switching to the selection mode. As described above, in the cursor moving mode, only the cursor C11 is displayed and moved.

Figures 10A, 10B, 10C:
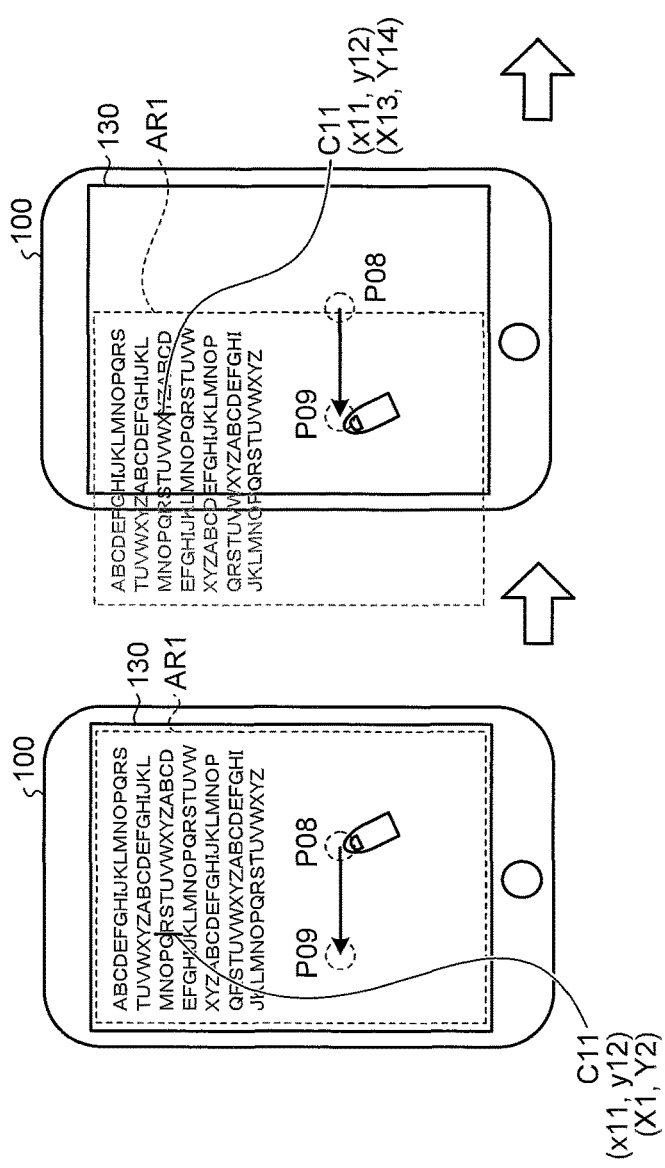
FIGS. 10A to 10C are schematic diagrams illustrating an example of cursor moving processing according to the embodiment.

FIGS. 10A to 10C are schematic diagrams illustrating an example of the cursor moving processing according to another modification. As illustrated in FIG. 10A, the information processing apparatus 100 displays the text in the display region AR1 and the cursor C11 on the text as a result of starting a memo pad application. The cursor C11 is positioned between "Q" and "R" in the third line in the text. The position of the cursor C11 in the display unit 130 is the position (x11,y12). The position of the cursor C11 in the display region AR1 is the position (X11,Y12).

It is assumed that the user wants to position the cursor between "X" and "Y" in the third line in the text. The user applies a certain operation to the display unit 130 so as to cause the information processing apparatus 100 to switch a current mode to the cursor moving mode. In other words, when receiving a certain operation to the display unit 130, the information processing apparatus 100 switches the current mode to the cursor moving mode for moving the cursor C11 by moving the display region AR1. In the present embodiment, the certain operation for switching the current mode to the cursor moving mode is long pressing operation to the display unit 130.

At the state as illustrated in FIG. 10A, the information processing apparatus 100 is assumed to detect the moving operation that traces the display unit 130 from a position P08, which is any position, to a position P09 with a finger, for example. In this case, as illustrated in FIG. 10B, the information processing apparatus 100 moves the display position of the display region AR1 in accordance with the moving operation while maintaining the cursor C11 at the position (x11,y12) in the display unit 130.

Because the display position of the display region AR1 is moved while the cursor C11 is maintained at the position (x11,y12) in the display unit 130, the position of the cursor C11 in the display unit 130 remains unchanged at the position (x11,y12) in FIGS. 10A and 10B. In contrast, the position of the cursor C11 in the display region AR1 moves to the position (X13,Y14) between "X" and "Y" in the third line in the text in accordance with the moving operation as illustrated in FIG. 10B whereas the position of the cursor C11 in the display region AR1 is the position (X11,Y12) between "Q" and "R" in the third line in the text as illustrated in FIG. 10A.

It is assumed that the user releases the finger from the display unit 130 when the moving operation reaches the position P09. The information processing apparatus 100, thus, does not detect the moving operation, and then returns the display region AR1 to the original display position before the movement while maintaining the cursor C11 at the position (X13,Y14) in the display region AR1.

Because the display region AR1 is returned to the original display position before the movement while the cursor C11 is maintained at the position (X13,Y14) in the display region AR1, the position of the cursor C11 in the display unit 130 illustrated in FIG. 10C moves to the position (x13,y14) from the position (x11,y12) illustrated in FIG. 10B in the display unit 130 in accordance with the moving operation. In contrast, the position of the cursor C11 in the display region AR1 illustrated in FIG. 10C remains at the position (X13, Y14) in the display region AR1 illustrated in FIG. 10B, i.e., remains at the position between "X" and "Y" in the third line in the text.

In this way, the information processing apparatus 100 can move the position of the cursor C11 in the display region AR1 by moving the display position of the display region AR1 in accordance with the moving operation while maintaining the cursor C11 at the position in the display unit 130.

The user moves the cursor to any position by touching any position on the text in some cases, for example. In such operation, it is difficult for the user to move the cursor to any position in some cases such as a case where characters are covered by a finger, for example. The information processing apparatus 100 avoids such situations and allows the user to move the cursor to any position easily and accurately.

It is difficult for the user to move well the cursors to desired positions serving as the starting point and the ending point of the selection range in some cases such as a case where characters are covered by a finger when selecting certain part of the text, for example. As described with reference to FIG. 10B, the information processing apparatus 100 according to the present embodiment can adjust the position of the cursor C11 serving as the starting point by moving the display region AR1. As described, the information processing apparatus 100 can adjust the position of the cursor C12 serving as the ending point by moving the display region AR1. Consequently, the information processing apparatus 100 allows the user to easily and accurately select the range, thereby making it possible to enhance the usability.

The user first moves the cursor C11 to any position by the cursor moving processing performed by the information processing apparatus 100 as described above. When the switching operation for switching a current mode to the range selection mode is detected under such a state, the range selection processing described above may be achieved as a result of the cursor control unit 162 displaying the cursor C12 different from the cursor C11 displayed in the display region AR1. In this case, the state illustrated in FIG. 10C corresponds to the state illustrated in FIG. 1A.

The various types of processing described in the range selection processing are also applicable to the cursor moving processing described with reference to FIGS. 10A to 10C. Specifically, examples of the applicable processing include the processing that maintains the cursor C11 near the original display position before the movement, the processing that moves the cursor C11 to the position to which a single touch is made, and the processing that positions the cursor C11 between morphemes or characters in accordance with the moving amount of the display region AR1.

5-7. Structure

In the example described in the present embodiment, when moving the display region AR1 in accordance with the moving operation, the display position change unit 164 controls the positions of the cursors C11 and C12. For example, the display position change unit 164 moves the display position of the display region AR1 in accordance with the moving operation together with the cursor C11 while maintaining the cursor C12 near the original display position in the display unit 130, in the present embodiment. The control of the cursors may be performed by the cursor control unit 162 instead of the display position change unit 164. In this case, the display position change unit 164 instructs, to the cursor control unit 162 at any time, the display positions of the cursors and display form in the movement of the display position of the display region AR1. The cursor control unit 162 and the display position change unit 164 may be integrated with each other as a single unit, for example.

5-8. Selection Object

In the embodiments, the display object displayed in the display region AR1 is characters (text) and a range in the characters is selected. The display object may be pictographs or photographs, and such display target other than characters may be selected by the range selection processing.

5-9. Hardware Structure

Figure 11:
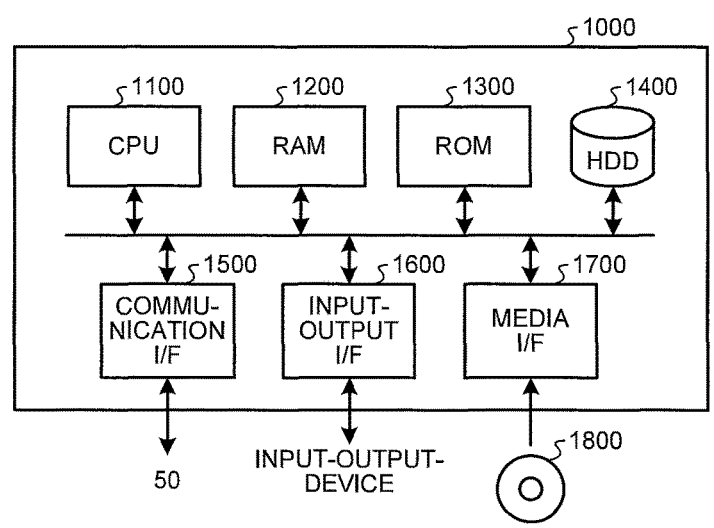
FIG. 11 is a hardware structural diagram illustrating an example of a computer that achieves the functions of the information processing apparatus.

The information processing apparatus 100 according to the present embodiment is achieved by a computer 1000 having the structure illustrated in FIG. 11, for example. FIG. 11 is a hardware structural diagram illustrating an example of the computer 1000 that achieves the functions of the information processing apparatus 100. The computer 1000 includes a CPU 1100, a RAM 1200, a read-only memory (ROM) 1300, a hard disk drive (HDD) 1400, a communication interface (I/F) 1500, an input-output interface (I/F) 1600, and a media interface (I/F) 1700.

The CPU 1100 operates on the basis of a computer program stored in the ROM 1300 or the HDD 1400 and controls the respective components. The ROM 1300 stores therein a boot program executed by the CPU 1100 when the computer 1000 is booted and computer programs dependent on the hardware of the computer 1000, for example.

The HDD 1400 stores therein computer programs executed by the CPU 1100 and data used by the computer programs, for example. The communication interface 1500 receives data from another apparatus via a communication network 50 (corresponding to a network N) and sends the data to the CPU 1100. The communication interface 1500 transmits data produced by the CPU 1100 to another apparatus via the communication network 50.

The CPU 1100 controls output devices such as a display and a printer and input devices such as a keyboard and a mouse via the input-output I/F 1600. The CPU 1100 acquires data from the input devices via the input-output I/F 1600. The CPU 1100 outputs produced data to the output devices via the input-output I/F 1600.

The media I/F 1700 reads a computer program or data stored in a recording medium 1800 and provides the data to the CPU 1100 via the RAM 1200. The CPU 1100 loads the computer program in the RAM 1200 from the recording medium 1800 via the media I/F 1700 and executes the loaded computer program. The recording medium 1800 is an optical recording medium such as a digital versatile disc (DVD) or a phase change rewritable disc (PD), a magneto-optical recording medium such as a magneto-optical disc (MO), a tape medium, a magnetic recording medium, or a semiconductor memory.

For example, when the computer 1000 functions as the information processing apparatus 100 according to the present embodiment, the CPU 1100 of the computer 1000 executes the computer program loaded in the RAM 1200 to achieve the functions of the control unit 140. The HDD 1400 stores therein the data in the storage unit 170. The CPU 1100 of the computer 1000, which reads the computer programs from the recording medium 1800 and executes them, may acquire the computer programs from another device via the communication network 50.

6. Others

In the processes described in the present embodiment, all or a part of the processes described to be automatically performed can also be manually performed. Alternatively, all or a part of the processes described to be manually performed can also be automatically performed by known methods. In addition, the processing procedures, the specific names, and information including various types of data and parameters described in the above description and drawings can be changed as required unless otherwise specified. For example, the various types of information illustrated in the respective drawings are not limited to them.

Furthermore, the components of the devices illustrated in the drawings are functionally conceptual, and are not always required to be physically configured as illustrated in the drawings. That is, specific forms of distribution and integration of the devices are not limited to those illustrated in the drawings. All or a part of the devices can be configured to be functionally or physically distributed or integrated in any desired units in accordance with various loads, the usage states, and the like.

The embodiments described above can be combined as appropriate without inconsistency among them.

7. Advantageous Effects

The information processing apparatus 100 according to the above-described embodiment includes the cursor control unit 162, the display position change unit 164, and the range selection unit 165. When the switching operation for switching a current mode to the selection mode for selecting characters included in the display region AR1 displayed in the display unit is detected, the cursor control unit 162 displays, in the display region AR1, another cursor different from a cursor displayed in the display region AR1. When the moving operation for moving the display region AR1 is detected in the selection mode, the display position change unit 164 maintains one cursor at the original display position or at a certain position near the original display position in the display unit and moves the display position of the display region AR1 together with the other cursor in accordance with the moving operation. The range selection unit 165 determines the region between the cursors after the movement of the display position of the display region AR1 by the display position change unit to be the selection range.

The information processing apparatus 100, thus, can adjust the position of the cursor C12 serving as the ending point by moving the display region AR1, thereby making it possible for the user to easily and accurately select the range. Consequently, the information processing apparatus 100 can enhance the usability.

When the moving operation is detected in a state where one cursor is displayed at a first position in the display unit and the other cursor is displayed at a second position in the display region AR1, the display position change unit 164 of the information processing apparatus 100 according to the present embodiment moves the display position of the display region AR1 in accordance with the moving operation while maintaining the one cursor at the first position in the display unit 130 and the other cursor at the second position in the display region AR1.

The information processing apparatus 100, thus, can adjust the position of the cursor C12 serving as the ending point by moving the display region AR1, thereby making it possible for the user to easily and accurately select the range. Consequently, the information processing apparatus 100 can enhance the usability.

The cursor control unit 162 of the information processing apparatus 100 according to the present embodiment displays another cursor different from a cursor displayed in the display region AR1 at the detection position where the switching operation is detected.

The information processing apparatus 100, thus, can display the cursor (the cursor C12) serving as the ending point at the position the user touches, thereby making it possible for the user to easily recognize that the mode has switched to the range selection mode. The information processing apparatus 100 can also display the cursor (the cursor C12) serving as the ending point at the user's desired position, thereby making it possible to enhance the usability.

When the operation that designates a certain position in the display region AR1 is detected after the different cursor is displayed, the cursor control unit 162 moves any one of the cursors displayed in the display region AR1 to the designated position.

The information processing apparatus 100, thus, can allow the user to move the cursor (the cursor C12) serving as the ending point of the selection range to a rough position and thereafter to perform fine adjustment on the cursor serving as the ending point by moving the display position of the display region AR1. Consequently, the information processing apparatus 100 can enhance the usability.

When the moving operation is detected, the display position change unit 164 maintains the cursor moved by the cursor control unit 162 at the designated certain position or a certain position near the designated certain position, and moves the display position of the display region AR1 in accordance with the moving operation together with the other cursor.

The information processing apparatus 100, thus, can allow the user to perform fine adjustment of the position of the cursor serving as the ending point by moving the display position of the display region AR1, thereby making it possible to enhance the usability.

The moving operation detection unit 163 of the information processing apparatus 100 according to the present embodiment detects the moving operation for moving the display region AR1 displayed in the display unit. When the moving operation is detected by the moving operation detection unit, the display position change unit 164 maintains the cursor displayed in the display region AR1 at the original display position or at a certain position near the original display position in the display unit 130, and moves the display position of the display region in accordance with the moving operation.

The information processing apparatus 100, thus, can easily and accurately move the cursor, thereby making it possible to enhance the usability.

When the moving operation ends, the display position change unit 164 returns the display position of the display region AR1 to the display position before the movement together with the cursors displayed in the display region AR1.

The information processing apparatus 100, thus, can allow the user to visually recognize again the text or the selection range that was no more displayed in the display unit 130 as a result of the movement of the display region AR1.

The moving operation detection unit 163 detects the first moving operation or the second moving operation as the moving operation. When the first moving operation ends, the display position change unit 164 maintains the display position of the display region AR1 at the display position moved according to the first moving operation. When the second moving operation ends, the display position change unit 164 returns the display position of the display region AR1 to the display position before the movement together with the cursors displayed in the display region AR1.

The information processing apparatus 100, thus, can allow the user to set the selection range at will and to freely browse the text even in the selection mode.

The display position change unit 164 moves the display position of the display region AR1 in accordance with the moving operation such that the cursor is positioned at a certain position in characters included in the display region AR1.

The information processing apparatus 100, thus, can move the cursor taking into consideration the user's convenience in text editing, thereby making it possible to enhance the degree of satisfaction of the user to the text editing.

When a moving amount of the display region AR1 according to the moving operation is larger than a certain value, the display position change unit 164 moves the display position of the display region AR1 while maintaining the cursor between morphemes included in the display region AR1 and at the original display position or a certain position near the original display position in the display unit 130.

The information processing apparatus 100, thus, can enhance the degree of satisfaction of the user to the text editing.

When a moving amount of the display region AR1 according to the moving operation is smaller than the certain value, the display position change unit 164 moves the display position of the display region AR1 while maintaining the cursor between characters included in the display region AR1 and at the original display position or a certain position near the original display position in the display unit 130.

The information processing apparatus 100, thus, can enhance the degree of satisfaction of the user to the text editing.

When moving the display position of the display region AR1 in accordance with the moving operation, the display position change unit 164 highlights the surroundings of the cursor maintained at the original display position or a certain position near the original display position in the display unit 130.

The information processing apparatus 100, thus, can prevent the user from losing sight of the cursor serving as the ending point in the selection range.

The display position change unit 164 magnifies and displays the characters around the cursor maintained at the original display position or a certain position near the original display position in the display unit 130 so as to highlight the surroundings of the cursor.

The information processing apparatus 100, thus, can prevent the user from losing sight of the cursor serving as the ending point in the selection range.

Some embodiments of the present application are described in detail with reference to the accompanying drawings by way of example. The present invention can be implemented in other embodiments changed or modified on the basis of the knowledge of the persons skilled in the art, besides the embodiments described herein.

The term "unit" described above can be replaced with a "section", a "module", or a "circuit", for example. For example, the display position change unit can be replaced with a display position change section or a display position change circuit.

An aspect of an embodiment has an advantageous effect of being capable of enhancing the usability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a processor programmed to:
display, in a display region displayed on a display, a first cursor and a second cursor, the second cursor being different than the first cursor, the second cursor being displayed in the display region in response to detecting a switching operation that switches to a selection mode for selecting a display object included in the display region;
in response to detecting a moving operation for moving the display region in any direction in the display during the selection mode, (i) maintain the first cursor at an original display position relative to the display region or a certain position near the original display position relative to the display region in the display, (ii) move a display position of the display region, in the direction in which the moving operation for moving the display region is performed, together with the second, cursor relative to the display region, and (iii) while the first cursor is maintained at the original display position relative to the display region or the certain position near the original display position relative to the display region, move the display position of the display region and the second cursor diagonally in accordance with the moving operation when the direction of the moving operation is detected to be diagonal; and
determine a region between the first cursor and the second cursor after the movement of the display position of the display region during the moving operation to be a selection range.

2. The information processing apparatus according to claim 1, wherein, when the moving operation is detected in a state where the first cursor is displayed at a first position in the display and the second cursor is displayed at a second position in the display region, the processor is programmed to move the display position of the display region in accordance with the moving operation while maintaining the first cursor at the first position in the display and the second cursor at the second position in the display region.

3. The information processing apparatus according to claim 1, wherein the processor is programmed to display the first cursor at a detection position where the switching operation is detected.

4. The information processing apparatus according to claim 1, wherein, when an operation that designates a certain position of the display region is detected after the first cursor is displayed, the processor is programmed to move any one of the first cursor and the second cursor displayed in the display region to the designated certain position.

5. The information processing apparatus according to claim 4, wherein, when the moving operation is detected, the processor is programmed to maintain the one cursor moved to the designated certain position or a certain position near the designated certain position, and move the display position of the display region in accordance with the moving operation together with the other cursor, which was not moved to the designated certain position.

6. An information processing apparatus comprising:
a processor programmed to:
detect a moving operation for moving a display region displayed in a display, the display displaying a first cursor and the second cursor, the second cursor being different than the first cursor; and
in response to detecting the moving operation for moving the display region in any direction in the display during a selection mode, (i) maintain the first cursor displayed in the display region at an original display position relative to the display region or at a certain position near the original display position relative to the display region in the display, (ii) move a display position of the display region, in the direction in which the moving operation for moving the display region is performed, together with the second, cursor relative to the display region, and (iii) while the first cursor is maintained at the original display position relative to the display region or the certain position near the original display position relative to the display region, move the display position of the display region and the second cursor diagonally in accordance with the moving operation when the direction of the moving operation is detected to be diagonal.

7. The information processing apparatus according to claim 1, wherein, when the moving operation ends, the processor is programmed to return the display position of the display region to the display position before the movement together with the first cursor and the second cursor displayed in the display region.

8. The information processing apparatus according to claim 1, wherein the processor is programmed to:
detect a first moving operation or a second moving operation as the moving operation, and
maintain the display position of the display region at a display position after movement according to the first moving operation when the first moving operation ends, and return the display position of the display region to a display position before the movement together with the first cursor and the second cursor displayed in the display region when the second moving operation ends.

9. The information processing apparatus according to claim 1, wherein the processor is programmed to move the display position of the display region in accordance with the moving operation such that the second cursor is positioned at a certain position in a character included in the display region.

10. The information processing apparatus according to claim 9, wherein, when a moving amount of the display region according to the moving operation is larger than a certain value, the processor is programmed to move the display position of the display region while maintaining the cursor between morphemes included in the display region and at the original display position or at a certain position near the original display position in the display.

11. The information processing apparatus according to claim 9, wherein, when a moving amount of the display region according to the moving operation is smaller than a certain value, the processor is programmed to move the display position of the display region while maintaining the first cursor between characters included in the display region and near the original display position or at a certain position near the original display position in the display.

12. The information processing apparatus according to claim 1, wherein, when moving the display position of the display region in accordance with the moving operation, the processor is programmed to highlight surroundings of the first cursor maintained at the original display position or at a certain position near the original display position in the display.

13. The information processing apparatus according to claim 12, wherein the processor is programmed to magnify and display characters around the first cursor maintained at the original display position or at a certain position near the original display position in the display so as to highlight the surroundings of the first cursor.

14. A non-transitory computer readable storage medium having stored therein an information display program causing a computer to execute a process comprising:
displaying, in a display region displayed on a display, a first cursor and a second cursor, the second cursor being different than the first cursor, the second cursor being displayed in the display region in response to detecting a switching operation that switches to a selection mode for selecting a display object included in the display region;
in response to detecting a moving operation for moving the display region in any direction in the display during the selection mode, (i) maintain the first cursor at an original display position relative to the display region or a certain position near the original display position relative to the display region in the display, (ii) move a display position of the display region, in the direction in which the moving operation for moving the display region is performed, together with the second, cursor relative to the display region, and (iii) while the first cursor is maintained at the original display position relative to the display region or the certain position near the original display position relative to the display region, move the display position of the display region and the second cursor diagonally in accordance with the moving operation when the direction of the moving operation is detected to be diagonal; and
determining a region between the first cursor and the second cursor after the movement of the display position of the display region during the moving operation to be a selection range.

15. An information display method that is executed by a computer, the information display method comprising:
displaying, in a display region displayed on a display, a first cursor and a second cursor, the second cursor being different than the first cursor, the second cursor being displayed in the display region in response to detecting a switching operation that switches to a selection mode for selecting a display object included in the display region;
in response to detecting a moving operation for moving the display region in any direction in the display during the selection mode, (i) maintain the first cursor at an original display position relative to the display region or a certain position near the original display position relative to the display region in the display, (ii) move a display position of the display region, in the direction in which the moving operation for moving the display region is performed, together with the second, cursor relative to the display region, and (iii) while the first cursor is maintained at the original display position relative to the display region or the certain position near the original display position relative to the display region, move the display position of the display region and the second diagonally in accordance with the moving operation when the direction of the moving operation is detected to be diagonal; and
determining a region between the first cursor and the second cursor after the movement of the display position of the display region during the moving operation to be a selection range.

* * * * *